(12) United States Patent
Wang et al.

(10) Patent No.: US 10,187,829 B2
(45) Date of Patent: Jan. 22, 2019

(54) METHOD AND APPARATUS FOR CELL HANDOVER AND RECONFIGURATION

(71) Applicant: FUJITSU CONNECTED TECHNOLOGIES LIMITED, Kawasaki-shi, Kanagawa (JP)

(72) Inventors: Yi Wang, Beijing (CN); Lei Zhang, Beijing (CN); Haibo Xu, Beijing (CN)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 257 days.

(21) Appl. No.: 14/688,471

(22) Filed: Apr. 16, 2015

(65) Prior Publication Data

US 2015/0223124 A1    Aug. 6, 2015

Related U.S. Application Data

(63) Continuation of application No. PCT/CN2012/083235, filed on Oct. 19, 2012.

(51) Int. Cl.
*H04W 36/00* (2009.01)
*H04W 24/08* (2009.01)
*H04W 72/04* (2009.01)

(52) U.S. Cl.
CPC ....... *H04W 36/0083* (2013.01); *H04W 24/08* (2013.01); *H04W 36/0072* (2013.01); *H04W 72/0446* (2013.01)

(58) Field of Classification Search
CPC ......... H04W 36/0055–36/0094; H04W 36/26; H04W 24/08; H04W 24/10;
(Continued)

(56) References Cited

U.S. PATENT DOCUMENTS 8,260,297 B2   9/2012  Jeong et al.
8,768,362 B2   7/2014  Shimonabe et al.
(Continued)

FOREIGN PATENT DOCUMENTS

CN    101242656 A    8/2008
CN    101668320 A    3/2010
(Continued)

OTHER PUBLICATIONS

Partial supplementary European search report issued by the European Patent Office for corresponding European Patent Application No. 12886831.2, dated May 18, 2016.
(Continued)

*Primary Examiner* — Mehmood B. Khan
(74) *Attorney, Agent, or Firm* — Myers Wolin, LLC

(57) ABSTRACT

A method and apparatus for cell handover and reconfiguration includes: performing cell measurement and reporting a result of measurement by UE according to a cell measurement request; detaching, when the UE receives a handover command transmitted by a macro eNB or a serving eNB of the UE, from the serving eNB by the UE and reserving an uplink time adjustment parameter $N_{TA}$ of the serving eNB by the UE; and performing cell handover and reconfiguration by the UE according to the handover command. With the method and apparatus of the embodiments, When the UE is still in a state of being connected to the serving eNB, the target eNB begins to detect its uplink signal to determine uplink time advance of the UE and the target eNB, and the UE replaces the source serving eNB with a new target eNB according to indication of other cells.

3 Claims, 12 Drawing Sheets

(58) Field of Classification Search
CPC ......... H04W 36/0072; H04W 36/0083; H04W 72/0446; H04W 72/1278–72/1294
See application file for complete search history.

(56) References Cited

U.S. PATENT DOCUMENTS

| | | | |
|---|---|---|---|
| 9,113,424 B2 | 8/2015 | Takeuchi et al. | |
| 9,763,203 B2* | 9/2017 | Dinan | H04W 52/146 |
| 9,820,244 B2* | 11/2017 | Earnshaw | G01S 5/0063 |
| 2007/0149206 A1* | 6/2007 | Wang | H04W 36/0077 455/450 |
| 2007/0293224 A1* | 12/2007 | Wang | H04W 36/0055 455/436 |
| 2008/0084849 A1* | 4/2008 | Wang | H04W 36/08 370/332 |
| 2008/0182579 A1 | 7/2008 | Wang et al. | |
| 2008/0254800 A1* | 10/2008 | Chun | H04W 48/12 455/438 |
| 2011/0171949 A1* | 7/2011 | Liao | H04W 56/0045 455/422.1 |
| 2012/0002643 A1* | 1/2012 | Chung | H04J 11/0093 370/331 |
| 2012/0093128 A1* | 4/2012 | Song | H04W 36/0077 370/331 |
| 2012/0099439 A1 | 4/2012 | Baldemair et al. | |
| 2012/0184278 A1* | 7/2012 | Chin | H04W 36/0072 455/438 |
| 2012/0231796 A1 | 9/2012 | Meylan et al. | |
| 2012/0287917 A1* | 11/2012 | Chin | H04W 36/0055 370/347 |
| 2013/0250911 A1* | 9/2013 | Kwon | H04W 56/00 370/331 |
| 2013/0250925 A1* | 9/2013 | Lohr | H04W 72/0446 370/336 |
| 2014/0016559 A1* | 1/2014 | Jang | H04W 76/19 370/328 |
| 2014/0023054 A1 | 1/2014 | Yang et al. | |
| 2014/0105192 A1* | 4/2014 | Park | H04W 56/00 370/336 |
| 2015/0023343 A1* | 1/2015 | Ohta | H04W 56/0045 370/350 |
| 2017/0245232 A1* | 8/2017 | Kwon | H04W 56/0005 |
| 2017/0332408 A1* | 11/2017 | Dinan | H04W 56/0005 |

FOREIGN PATENT DOCUMENTS

| | | | |
|---|---|---|---|
| CN | 101835224 A | | 9/2010 |
| CN | 101932052 A | | 12/2010 |
| CN | 102124793 A | | 7/2011 |
| CN | 102238720 A | | 11/2011 |
| CN | 102695285 A | | 9/2012 |
| CN | 102740444 A | | 10/2012 |
| EP | 2 448 329 A1 | | 5/2012 |
| EP | 2 456 109 A2 | | 5/2012 |
| EP | 2448329 A1 * | 5/2012 | ........ H04W 36/0077 |
| EP | 2911449 A4 * | 10/2016 | ............ H04W 24/08 |
| JP | 2011-114702 A1 | | 6/2011 |
| JP | 2012-114512 A | | 6/2012 |
| KR | 10-2007-0081013 A | | 8/2007 |
| WO | 2009/155992 A1 | | 12/2009 |
| WO | 2010/150463 A1 | | 12/2010 |
| WO | 2011/024655 A1 | | 3/2011 |
| WO | 2011/040852 A1 | | 4/2011 |
| WO | 2011/040987 A1 | | 4/2011 |
| WO | 2011/156769 A1 | | 12/2011 |
| WO | 2012/119475 A | | 9/2012 |
| WO | 2012/137034 A1 | | 10/2012 |
| WO | 2012/137034 A8 | | 10/2012 |

OTHER PUBLICATIONS

First Office Action issued by the Japan Patent Office for corresponding Japanese Patent Application No. 2015-537100, dated Jun. 21, 2016, with an English translation.

Huawei, "Uplink Timing Acquisition in LTE Handover", Agenda Item: 11, 3GPP TSG-RAN WG2 Ad hoc Meeting, R2-061892, Cannes, France, Jun. 27-30, 2006.

3GPP TS 36.300 V11.3.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; "Stage 2 (Release 11)", Sep. 2012.

Huawei et al., "Uplink timing advance for CoMP", Agenda Item: 7.5.6.4, 3GPP TSG-RAN WG1 Meeting #68bis, R1-120991, Jeju, Korea, Mar. 26-30, 2012.

Motorola Mobility, "DL Timing Reference for UL CoMP", Agenda Item: 7.5.6.4, 3GPP TSG-RAN WG1 Meeting #69, R1-122954, Prague, Czech Republic, May 21-25, 2012.

Extended European search report with supplementary European search report and the European search opinion issued by the European Patent Office for corresponding European Patent Application No. 12886831.2, dated Sep. 5, 2016.

English Translation of the International Preliminary Report on Patentability issued for corresponding International Patent Application No. PCT/CN2012/083235, dated Apr. 21, 2015.

English translation of the Written Opinion of the International Searching Authority issued for corresponding International Patent Application No. PCT/CN2012/083235, dated Jul. 25, 2013.

International Search Report issued for corresponding International Patent Application No. PCT/CN2012/083235, dated Jul. 25, 2013, with an English translation.

Office Action issued for corresponding Korean Patent Application No. 10-2015-7012189 dated Mar. 8, 2016 with an English translation.

First Notification of Office Action issued by the State Intellectual Property Office of China for corresponding Chinese Patent Application No. 201280076303.0, dated Nov. 16, 2017, with an English translation.

Search Report issued by the State Intellectual Property Office of China for corresponding Chinese Patent Application No. 201280076303.0, dated Nov. 16, 2017, with an English translation.

* cited by examiner

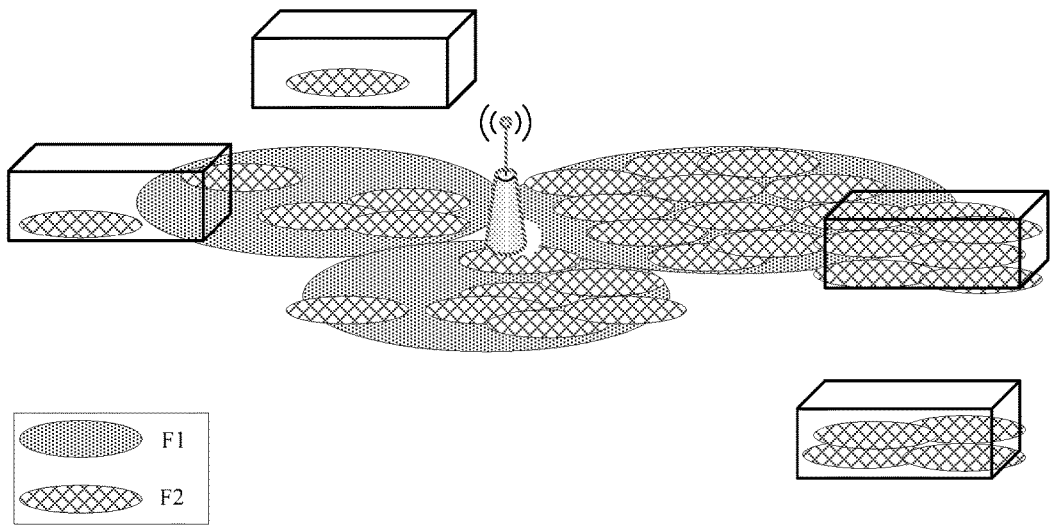

Fig. 1

201 performing cell measurement by UE according to a cell measurement request and reporting a measurement result

202 detaching from a serving eNB and reserving an uplink time adjustment parameter $N_{TA}$ of an source serving eNB by the UE after the UE receives a handover command transmitted by the macro eNB or the serving eNB

203 performing cell handover and reconfiguration by the UE according to the handover command

204 feeding reconfiguration completion information back to the macro eNB or a target eNB by the UE according to uplink resource allocation information after the UE receives the uplink resource allocation information transmitted by the macro eNB or the target eNB

205 determining uplink transmission time by the UE according to the reserved $N_{TA}$ value of the serving eNB and TA information in a TA command when the UE receives the TA command containing the uplink time advance information of the target eNB

Fig. 2

METHOD AND APPARATUS FOR CELL HANDOVER AND RECONFIGURATION

CROSS REFERENCE TO RELATED APPLICATIONS

This application is a continuation application of International Application PCT/CN2012/083235 filed on Oct. 19, 2012, the entire contents of which are incorporated herein by reference.

TECHNICAL FIELD

The present application relates to the field of wireless communication technologies, and in particular to a method and an apparatus for cell handover and reconfiguration.

BACKGROUND

As large increase of smart terminals, in further evolution of a future long-term evolution-advanced (LTE-Advanced) system, it is possible that a conventional macro eNB (macro eNB) cannot deal with demands for rapidly-increased capacities and peak-value rates. By further deploying eNBs more densely, a user is made to be more physically close to an eNB, thereby increasing a system capacity, increasing a peak-value rate, and improving user terminal experiences. However, deployment of a macro eNB with large power will result in problems of over high cost, and non-green communications, etc. Therefore, people have begun to take small eNBs (small eNBs) with low power into consideration, such as a pico cell (pico eNB), a femto cell (femto eNB), and a RRH (remote radio head), etc. A small eNB has comprehensively advantageous over a macro eNB as it is low in cost, fast and flexible in deployment, and high in cost performance ratio. Hence, a small eNB is very suitable for use in an outdoor hotspot, increases a network capacity, improves indoor depth coverage, and improves user perception. Therefore, more and more attention shall be paid to small eNBs in the industry. In a future LTE-Advanced network, the number of small eNBs will exceed that of conventional macro eNBs.

The coverage of a small eNB is less than that of a macro eNB, and higher available bands, such as 3.5 GHz, may be used, while a macro eNB follows using existing relatively low bands to provide a relatively large and robust coverage. For user equipment (UE) supporting multiple carrier aggregation (CA), both a macro eNB and a small eNB may be configured for the UE, which operate at different frequencies, i.e. different carrier components (CCs). Small eNBs may be in the coverage of a macro eNB, and small eNBs may also be out of the coverage of a macro eNB. Small eNBs may be deployed sparsely or densely. Small eNBs may appear in forms of clusters, that is, small eNBs physically close to each other are divided into one cluster. In the same cluster, each small eNB may be connected to the same eNB (evolved Node B). Then, a backhaul between each small eNB in the cluster may be deemed as being ideal, such as being less in time delay, and being capable in transmission. While in the coverage of a macro eNB, different clusters may be connected to different eNBs or to the same eNB. FIG. 1 is a schematic diagram of joint deployment of a small eNB and a macro eNB. As shown in FIG. 1, F2 is used to deploy a small eNB, and F1 is used to deploy a macro eNB.

It was found by the inventors in the implementation of the present application, when UE moves between small eNBs in the same cluster, if a conventional cell handover procedure is still followed, the UE will be in a state of frequent handover, which increases loads at the UE side, and a large amount of unnecessary information is interacted between the UE and an eNB and between eNBs.

It should be noted that the above description of the background art is merely provided for clear and complete explanation of the present application and for easy understanding by those skilled in the art. And it should not be understood that the above technical solution is known to those skilled in the art as it is described in the background of the present application.

SUMMARY

An object of the embodiments of the present application is to provide a method and an apparatus for cell handover and reconfiguration, so as to support UE to frequently handover between small eNBs, and simplify a handover procedure.

According to a first aspect of the embodiments of the present application, there is provided a method for cell handover and reconfiguration, including:

performing cell measurement by UE according to a cell measurement request and reporting a cell measurement result;

detaching, when the UE receives a handover command transmitted by a macro eNB or a serving eNB of the UE, from the serving eNB and reserving an uplink time adjustment parameter $N_{TA}$ of the serving eNB by the UE; and performing cell handover and reconfiguration by the UE according to the handover command.

According to a second aspect of the embodiments of the present application, there is provided a method for cell handover and reconfiguration, including:

determining, by a macro eNB, a target eNB selected for UE; and transmitting a handover command by the macro eNB to the UE, such that the UE performs cell handover and reconfiguration according to the handover command;

wherein, the UE detaches from its serving eNB and reserves an uplink time adjustment parameter $N_{TA}$ of the serving eNB when the UE receives the handover command.

According to a third aspect of the embodiments of the present application, there is provided a method for cell handover and reconfiguration, including:

detecting an uplink signal of UE according to control of other cells than a home;

acquiring uplink timing information of the UE relative to the home;

calculating uplink time advance of the home according to the uplink timing information; and providing the uplink time advance to a macro eNB.

According to a fourth aspect of the embodiments of the present application, there is provided a method for cell handover and reconfiguration, including:

transmitting a cell measurement request by an eNB to UE, such that the UE performs cell measurement according to the cell measurement request and reports a cell measurement result;

selecting a target eNB by the eNB for the UE according to the cell measurement result after receiving the cell measurement result reported by the UE; and controlling the target eNB to detect an uplink signal of the UE, so as to obtain uplink time advance information of the target eNB.

According to a fifth aspect of the embodiments of the present application, there is provided user equipment (UE), including:

a measuring unit configured to perform cell measurement according to a cell measurement request and report a cell measurement result;

a processing unit configured to detach, when the UE receives a handover command transmitted by a macro eNB or a serving eNB of the UE, from the serving eNB and reserve an uplink time adjustment parameter $N_{TA}$ of the serving eNB; and a configuring unit configured to perform cell handover and reconfiguration according to the handover command.

According to a sixth aspect of the embodiments of the present application, there is provided a macro eNB, including:

a determining unit configured to determine a target eNB selected for UE; and a transmitting unit configured to transmit a handover command to the UE, such that the UE performs cell handover and reconfiguration according to the handover command;

wherein the UE detaches from its serving eNB and reserves an uplink time adjustment parameter $N_{TA}$ of the serving eNB when receiving the handover command.

According to a seventh aspect of the embodiments of the present application, there is provided an eNB, including:

a detecting unit configured to detect an uplink signal of UE according to control of other cells than a home;

an acquiring unit configured to acquire uplink timing information of the UE relative to the home;

a calculating unit configured to calculate uplink time advance of the home according to the uplink timing information; and a processing unit configured to provide the uplink time advance to a macro eNB.

According to an eighth aspect of the embodiments of the present application, there is provided an eNB, including:

a transmitting unit configured to transmit a cell measurement request to UE, such that the UE performs cell measurement according to the cell measurement request and reports a cell measurement result;

a selecting unit configured to select a target eNB for the UE according to the cell measurement result after receiving the cell measurement result reported by the UE; and a controlling unit configured to control the target eNB to detect an uplink signal, so as to obtain uplink time advance information of the target eNB.

According to a ninth aspect of the embodiments of the present application, there is provided a method for cell handover and reconfiguration, including:

performing cell measurement by UE according to a cell measurement request of a serving eNB and reporting a cell measurement result;

detaching from the serving eNB by the UE and reserving an uplink time adjustment parameter $N_{TA}$ of the serving eNB by the UE after receiving a handover command transmitted by the serving eNB; and performing cell handover and reconfiguration by the UE according to the handover command.

According to a tenth aspect of the embodiments of the present application, there is provided a method for cell handover and reconfiguration, including:

transmitting a cell measurement request to UE, such that the UE performs cell measurement according to the cell measurement request and reports a cell measurement result;

selecting a target eNB for the UE according to the cell measurement result after receiving the cell measurement result reported by the UE;

controlling the target eNB to detect an uplink signal, so as to obtain uplink time advance information of the target eNB; and transmitting a handover command to the UE, such that the UE performs cell handover and reconfiguration according to the handover command;

wherein the UE detaches from its serving eNB and reserves an uplink time adjustment parameter $N_{TA}$ of the serving eNB after receiving the handover command.

According to an eleventh aspect of the embodiments of the present application, there is provided a method for cell handover and reconfiguration, including:

detecting an uplink signal of UE according to control of a serving eNB of the UE;

acquiring uplink timing information of the UE relative to a home;

calculating uplink time advance of the home according to the uplink timing information; and providing uplink time advance information containing the uplink time advance to the serving eNB of the UE.

According to a twelfth aspect of the embodiments of the present application, there is provided user equipment (UE), including:

a measuring unit configured to perform cell measurement according to a cell measurement request of a serving eNB and report a cell measurement result;

a processing unit configured to detach from the serving eNB and reserve an uplink time adjustment parameter $N_{TA}$ of the serving eNB after receiving a handover command transmitted by the serving eNB; and a configuring unit configured to perform cell handover and reconfiguration according to the handover command.

According to a thirteenth aspect of the embodiments of the present application, there is provided an eNB, including:

a transmitting unit configured to transmit a cell measurement request to UE, such that the UE performs cell measurement and according to the cell measurement request reports a cell measurement result;

a selecting unit configured to select a target eNB for the UE according to the cell measurement result after receiving the cell measurement result reported by the UE; and a controlling unit configured to control the target eNB to detect an uplink signal, so as to obtain time advance information of the target eNB; wherein the transmitting unit is further configured to transmit a handover command to the UE, such that the UE performs cell handover and reconfiguration according to the handover command;

wherein the UE detaches from its serving eNB and reserves an uplink time adjustment parameter $N_{TA}$ of the serving eNB after receiving the handover command.

According to a fourteenth aspect of the embodiments of the present application, there is provided an eNB, including:

a detecting unit configured to detect an uplink signal of UE according to control of a serving eNB of the UE;

an acquiring unit configured to acquire uplink timing information of the UE relative to a home;

a calculating unit configured to calculate uplink time advance of the home according to the uplink timing information; and a processing unit configured to provide the uplink time advance to the serving eNB of the UE.

According to a fifteenth aspect of the embodiments of the present application, there is provided a communication system, including the UE as described in the fifth aspect, the macro eNB as described in the sixth aspect, the target eNB as described in the seventh aspect, and the serving eNB as described in the eighth aspect.

According to a sixteenth aspect of the embodiments of the present application, there is provided a communication system, including the UE as described in the twelfth aspect, the serving eNB as described in the thirteenth aspect, and the target eNB as described in the fourteenth aspect.

According to another aspect of the embodiments of the present application, there is provided a computer-readable program, wherein when the program is executed in an eNB, the program enables a computer to carry out the method for cell handover and reconfiguration carried out in an eNB as described above in the eNB.

According to still another aspect of the embodiments of the present application, there is provided a storage medium in which a computer-readable program is stored, wherein the computer-readable program enables a computer to carry out the method for cell handover and reconfiguration carried out in an eNB as described above in an eNB.

According to further still another aspect of the embodiments of the present application, there is provided a computer-readable program, wherein when the program is executed in terminal equipment, the program enables a computer to carry out the method for cell handover and reconfiguration carried out in UE as described above in the terminal equipment.

According to yet still another aspect of the embodiments of the present application, there is provided a storage medium in which a computer-readable program is stored, wherein the computer-readable program enables a computer to carry out the method for cell handover and reconfiguration carried out in UE as described above in terminal equipment.

An advantage of the embodiments of the present application exists in that with the method and the apparatus of the embodiments, time delay due to uplink/downlink synchronization in the cell reconfiguration and handover process is reduced efficiently, and complexity of the UE is lowered.

With reference to the following description and drawings, the particular embodiments of the present application are disclosed in detail, and the principle of the present application and the manners of use are indicated. It should be understood that the scope of the embodiments of the present application is not limited thereto. The embodiments of the present application contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the application can be better understood with reference to the following drawings. The components in the drawings are not necessarily to scale, emphasis instead being placed upon clearly illustrating the principles of the present application. To facilitate illustrating and describing some parts of the application, corresponding portions of the drawings may be enlarged or reduced. Elements and features depicted in one drawing or embodiment of the application may be combined with elements and features depicted in one or more additional drawings or embodiments. Moreover, in the drawings, like reference numerals designate corresponding parts throughout the several views and may be used to designate like or similar parts in more than one embodiments. In the drawings:

FIG. 1 is a schematic diagram of joint deployment of a small eNB and a macro eNB;

FIG. 2 is a flowchart of the method for cell handover and reconfiguration of Embodiment 1 of the present application;

DETAILED DESCRIPTION

Figure 2A:
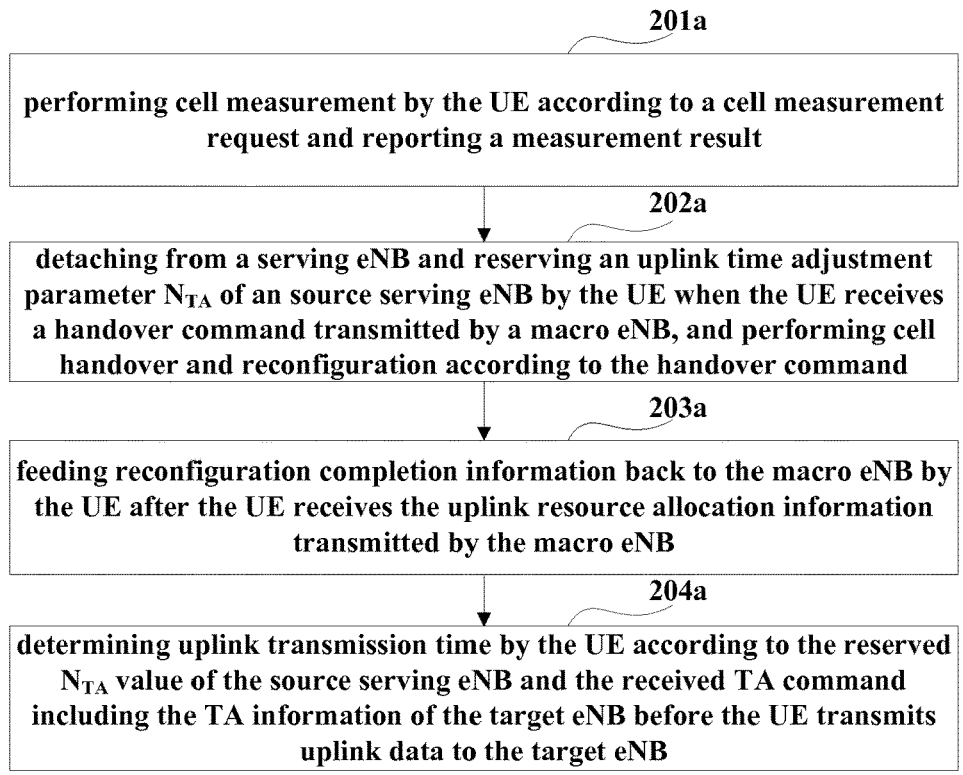
FIGS. 2A-2D are four modes of implementation of the embodiment shown in FIG. 2.

The foregoing and other features of the embodiments of the present application shall become apparent with reference to the drawings and the following description. These embodiments are illustrative only, and are not intended to limit the present application. For the principle and modes of implementation of the present application to be easily understood by those skilled in the art, the modes of implementation of the present application shall be described taking a method for cell handover and reconfiguration in a wireless communication system as an example. However, it should be understood that the present application is not limited to the above system, and is applicable to other systems related to cell handover and reconfiguration.

Embodiment 1

An embodiment of the present application provides a method for cell handover and reconfiguration, which is applicable to user equipment (UE). FIG. 2 is a flowchart of the method. Referring to FIG. 2, the method includes:

step 201: performing cell measurement by UE according to a cell measurement request and reporting a measurement result;

wherein, the cell measurement request may be transmitted by a macro eNB, and may also be transmitted by a small eNB serving for the UE (referred to as a serving eNB, in brief), and the macro eNB or the serving eNB informs the UE, according to a traffic demand, to perform cell measurement;

wherein, the UE performs measurement on a local cell and a neighboring cell based on the cell measurement request of the above cell, such as measuring carrier receiver signal strength indication (carrier RSSI), reference signal receiving power (RSRP), and/or reference signal receiving quality (RSRQ), etc.;

wherein, the macro eNB or the serving eNB will also allocate an uplink resource for the UE, such that the UE reports a measurement result; and this may be achieved by existing means, which shall not be described herein any further;

wherein, the UE may employ a manner of measurement identical to an existing cell handover, or a manner of measurement identical to an existing carrier component reconfiguration in carrier aggregation (CA), or a simplified manner of measurement, and the embodiment of the present application is not limited thereto;

step 202: detaching from a serving eNB and reserving an uplink time adjustment parameter $N_{TA}$ of a source serving eNB by the UE after the UE receives a handover command transmitted by the macro eNB or the serving eNB;

wherein, the handover command may be achieved in existing RRC (radio resource control) configuration or reconfiguration signaling, and may also be achieved via predefined RRC configuration or reconfiguration signaling; and when it is achieved via predefined RRC configuration or reconfiguration signaling, the predefined RRC configuration or reconfiguration signaling may be identical to RRC configuration or reconfiguration signaling used in reconfiguring carrier component in conventional carrier aggregation (CA), or may be further simplified, or may be modified with respect to some parameters; for example, a PCI (physical cell ID) of a target small eNB may be excluded, while a virtual cell ID may be included (assuming that small cells in a cluster use identical PCI, but use different virtual cell IDs);

wherein, detaching from a serving eNB by the UE refers to releasing parameters of the serving eNB; in this embodiment, in order to determine uplink transmission time, the UE needs to reserve the uplink time adjustment parameter $N_{TA}$ of the source serving eNB; and wherein, the UE may or may not reserve downlink timing information of the serving eNB;

in this embodiment, the serving eNB refers to a small eNB providing services to the UE at present, but not a macro eNB;

step 203: performing cell handover and reconfiguration by the UE according to the handover command;

wherein, the UE may perform the cell handover and reconfiguration by using existing means, and this embodiment of the present application is not limited thereto; and in the process of handover, the source serving eNB will deliver buffered and transit packets to a target eNB and transfer sequence number statuses (SN statuses) to the target eNB, and then forward data to the target eNB, and the target eNB may receive the buffer packets from the source serving eNB;

wherein, as to downlink synchronization of the UE with the target eNB, downlink time synchronization may be performed with the target eNB when the UE has not been handed over to the target eNB, and downlink time synchronization may be performed with the target eNB after the UE receives reconfiguration information; and this embodiment of the present application is not limited thereto;

in an embodiment, the UE needs to report reconfiguration completion information after the reconfiguration is completed, so as to enter a normal data transmission period; hence, in this embodiment, the method further includes:

step 204: feeding reconfiguration completion information back to the macro eNB or a target eNB by the UE according to uplink resource allocation information after the UE receives the uplink resource allocation information transmitted by the macro eNB or the target eNB;

wherein, if the uplink resource allocation information is transmitted by the macro eNB, the UE directly feeds the reconfiguration completion information back to the macro eNB after the reconfiguration is completed; and if the uplink resource allocation information is transmitted by the target eNB, the UE feeds the reconfiguration completion information back to the target eNB after the reconfiguration is completed;

in an embodiment, in order to transmit uplink data to the target eNB, such as feeding back the reconfiguration completion information to the target eNB, the UE further needs to determine uplink transmission time; hence, in this embodiment, the method further comprises:

step 205: determining uplink transmission time by the UE according to the reserved $N_{TA}$ value of the serving eNB and TA information in a TA command when the UE receives the TA command containing the uplink time advance information of the target eNB;

wherein, if the handover command is transmitted by the macro eNB, the TA command may be transmitted via the RRC reconfiguration information in step 202, such as adding TA command fields to the original radio resource control reconfiguration signaling, may be transmitted via the uplink resource allocation information in step 204, such as being transmitted via a random access response (RAR), and may also be transmitted via existing MAC signaling (referred to as predefined MAC signaling), that is, existing MAC signaling is reused; and if the handover command is transmitted by the source serving eNB of the UE, the TA command may be transmitted via the RRC reconfiguration information in step 202;

wherein, the target eNB may obtain the TA value of the target eNB through calculation by detecting an uplink signal of the UE; and the target eNB may enable the macro eNB to learn the TA value by interaction with the macro eNB; likewise, the target eNB may enable the source serving eNB of the UE to learn the TA value by interaction with the source serving eNB of the UE; and this embodiment of the present application is not limited to a particular method of interaction;

wherein, the uplink transmission time $N_{TA\_new}=N_{TA\_old}+$ TA; where, $N_{TA\_old}$ is an $N_{TA}$ value of the serving eNB reserved by the UE, and TA is a TA value in the received TA information of the target eNB; more broadly, $N_{TA\_old}$ is an $N_{TA}$ value before a new TA command is received, and $N_{TA\_new}$ is an $N_{TA}$ value for updating $N_{TA\_old}$ after receiving the TA command;

wherein, the UE may determine the uplink transmission time in at least the following three manners:

in a first manner, the UE may take a sampling point advanced by $N_{TA\_new}$ as the uplink transmission time with reference to downlink timing information of the target eNB for transmitting an uplink signal, $N_{TA\_new}$ being equal to the $N_{TA}$ value of the source serving eNB reserved by the UE plus a TA value that is received by the UE for the last time;

in a second manner, the UE may take the sampling point advanced by $N_{TA\_new}$ as the uplink transmission time with reference to downlink timing information of the source serving eNB for transmitting an uplink signal when the UE receives the uplink TA command described in step 206 (referred to as a first time advance command), $N_{TA\_new}$ being equal to the $N_{TA}$ value of the source serving eNB reserved by the UE plus the TA value, and take the sampling point advanced by $N_{TA\_new}$ as the uplink transmission time with reference to downlink timing information of the target eNB for transmitting an uplink signal when the UE receives subsequent TA commands (other time advance commands than the first time advance command), $N_{TA\_new}$ being equal to the $N_{TA\text{-}OLD}$ value plus the received TA value;

in a third manner, if downlink timing information of the target eNB is referenced and the TA value calculated at an eNB side does not take a downlink timing difference between the target eNB and the source serving eNB into consideration, the UE may take a sampling point advanced by $N_{TA\_new}+\Delta t$ as the uplink transmission time with reference to the downlink timing information of the target eNB according to a downlink timing difference $\Delta t$ obtained through measurement for transmitting an uplink signal when the UE receives a first time advance command, and take the sampling point advanced by $N_{TA\_new}$ as the uplink transmission time for transmitting an uplink signal when the UE receives subsequent TA commands (other time advance commands than the first time advance command).

In this embodiment, the order of executing the steps is not limited. For example, the time advance command may be before the uplink resource allocation information, or may be in the uplink resource allocation information, or may be after the uplink resource allocation information and before feeding back reconfiguration completion information, which may be determined according to an actual situation in particular implementation.

According to different orders of executing the steps, the method shown in FIG. 2 may have four implementations shown in FIGS. 2A-2D.

In an implementation, as shown in FIG. 2A, the steps of the method of this embodiment may be executed in the following order:

step 201*a*: performing cell measurement by the UE according to a cell measurement request and reporting a measurement result;

step 202*a*: detaching from a serving eNB and reserving an uplink time adjustment parameter $N_{TA}$ of a source serving eNB by the UE when the UE receives a handover command transmitted by a macro eNB, and performing cell handover and reconfiguration according to the handover command;

step 203*a*: feeding reconfiguration completion information back to the macro eNB by the UE after the UE receives the uplink resource allocation information transmitted by the macro eNB;

step 204*a*: determining uplink transmission time by the UE according to the reserved $N_{TA}$ value of the source serving eNB and the received TA command including the TA information of the target eNB before the UE transmits uplink data to the target eNB;

wherein, the TA command including the TA information of the target eNB may be transmitted via the handover command in step 202*a*, or transmitted via the uplink resource allocation information in step 204*a*, or transmitted via MAC signaling before step 204*a*.

Figure 2B:
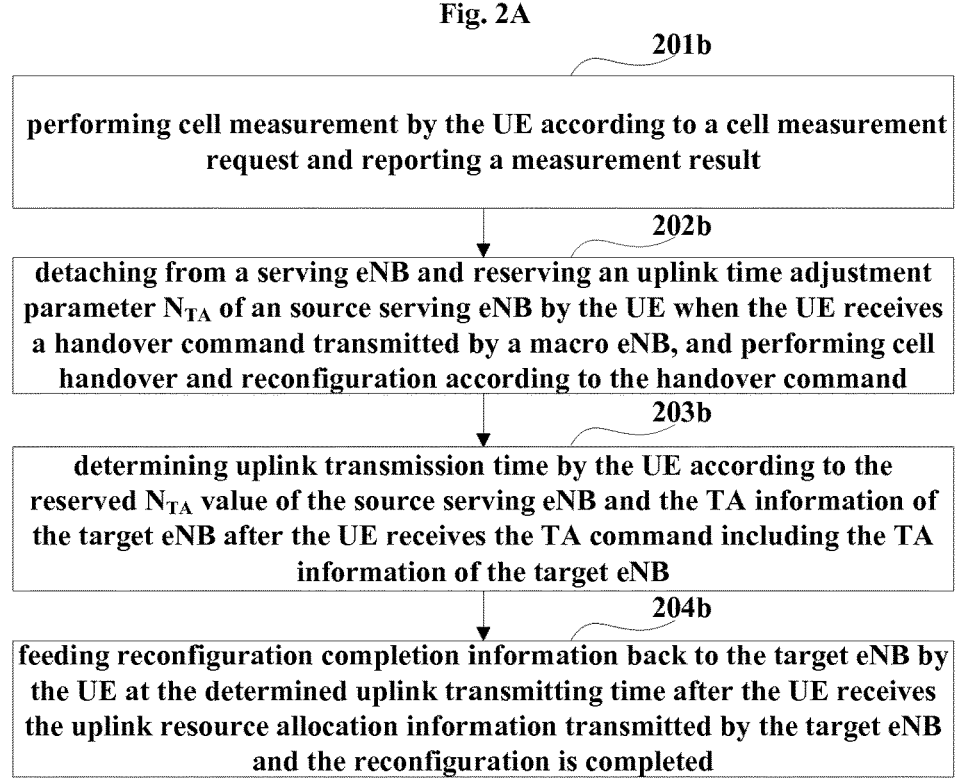

In an implementation, as shown in FIG. 2B, the steps of the method of this embodiment may also be executed in the following order:

step 201*b*: performing cell measurement by the UE according to a cell measurement request and reporting a measurement result;

step 202*b*: detaching from a serving eNB and reserving an uplink time adjustment parameter $N_{TA}$ of a source serving eNB by the UE when the UE receives a handover command transmitted by a macro eNB, and performing cell handover and reconfiguration according to the handover command;

step 203*b*: determining uplink transmission time by the UE according to the reserved $N_{TA}$ value of the source serving eNB and the TA information of the target eNB after the UE receives the TA command including the TA information of the target eNB;

step 204*b*: feeding reconfiguration completion information back to the target eNB by the UE at the determined uplink transmitting time after the UE receives the uplink resource allocation information transmitted by the target eNB and the reconfiguration is completed;

wherein, the TA command including the TA information of the target eNB may be transmitted via the handover command in step 202*b*, or transmitted via the uplink resource allocation information in step 204*b* (in this case, the UE first receives the uplink resource allocation information containing the TA command, and then determines the uplink transmission time), or transmitted via MAC signaling before step 203*b*.

Figure 2C:
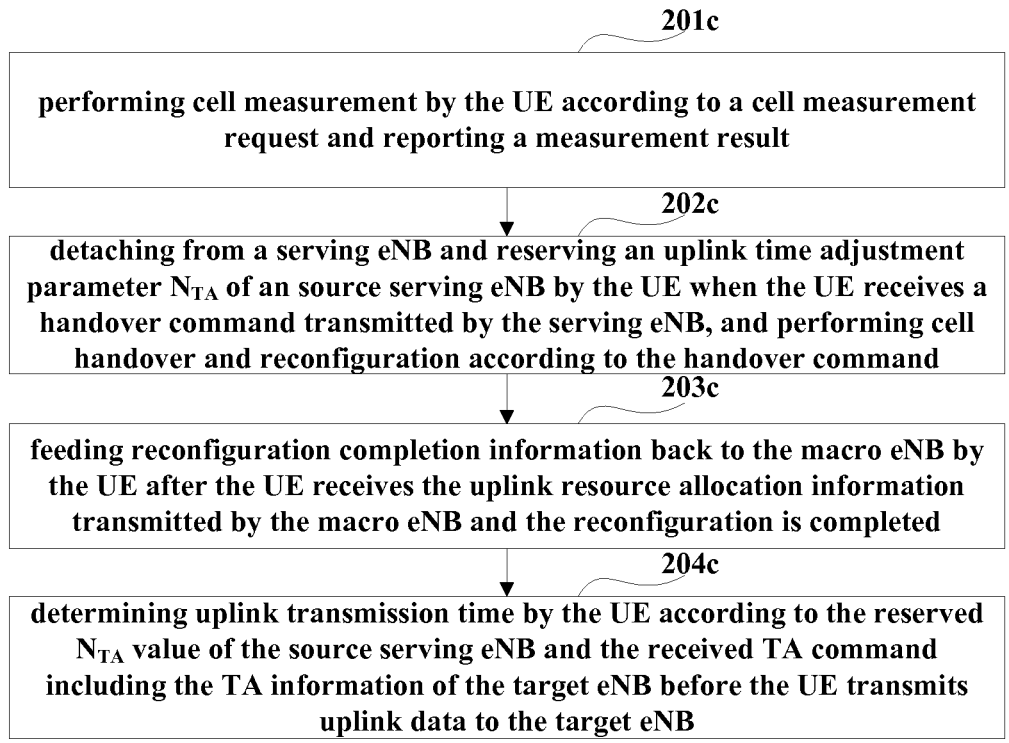

In an implementation, as shown in FIG. 2C, the steps of the method of this embodiment may also be executed in the following order:

step 201*c*: performing cell measurement by the UE according to a cell measurement request and reporting a measurement result;

step 202*c*: detaching from a serving eNB and reserving an uplink time adjustment parameter $N_{TA}$ of a source serving eNB by the UE when the UE receives a handover command transmitted by the serving eNB, and performing cell handover and reconfiguration according to the handover command;

step 203*c*: feeding reconfiguration completion information back to the macro eNB by the UE after the UE receives the uplink resource allocation information transmitted by the macro eNB and the reconfiguration is completed;

step 204*c*: determining uplink transmission time by the UE according to the reserved $N_{TA}$ value of the source serving eNB and the received TA command including the TA information of the target eNB before the UE transmits uplink data to the target eNB;

wherein, the TA command including the TA information of the target eNB may be transmitted via the handover command in step 202*c*.

Figure 2D:
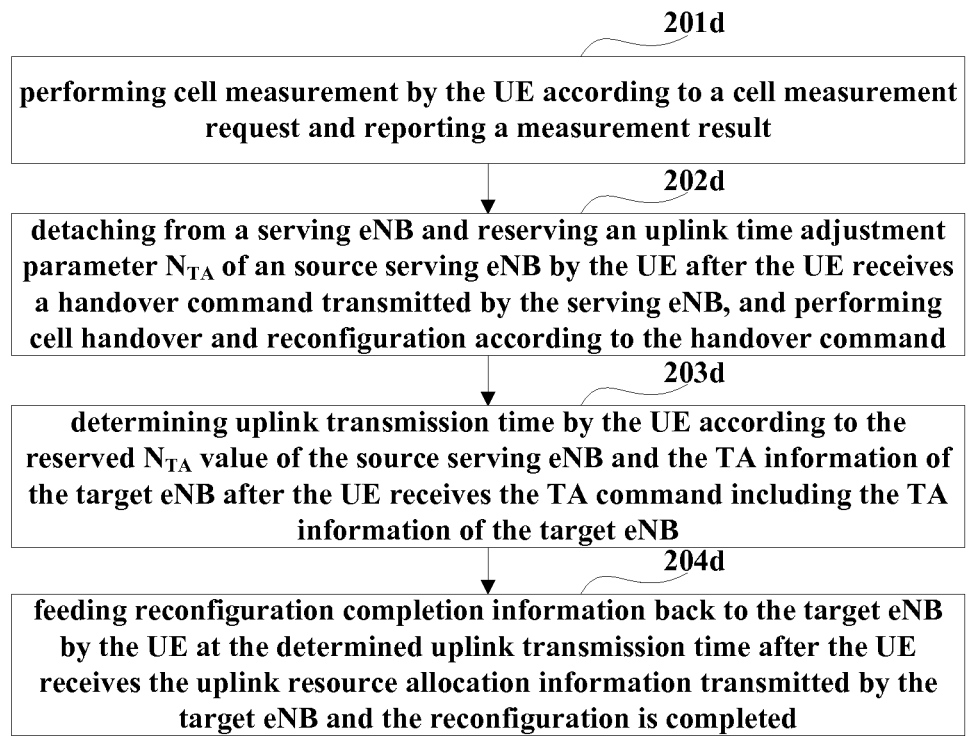

In an implementation, as shown in FIG. 2D, the steps of the method of this embodiment may also be executed in the following order:

step 201*d*: performing cell measurement by the UE according to a cell measurement request and reporting a measurement result;

step 202*d*: detaching from a serving eNB and reserving an uplink time adjustment parameter $N_{TA}$ of a source serving eNB by the UE after the UE receives a handover command transmitted by the serving eNB, and performing cell handover and reconfiguration according to the handover command;

step 203*d*: determining uplink transmission time by the UE according to the reserved $N_{TA}$ value of the source serving eNB and the TA information of the target eNB after the UE receives the TA command including the TA information of the target eNB;

step 204d: feeding reconfiguration completion information back to the target eNB by the UE at the determined uplink transmission time after the UE receives the uplink resource allocation information transmitted by the target eNB and the reconfiguration is completed;

wherein, the TA command including the TA information may be transmitted via the handover command in step 202d.

With the method of this embodiment, when the UE is still in a state of being connected to the source serving eNB, the target eNB is made to detect the uplink signal of the UE to acquire the uplink synchronization of the UE and the target eNB. Hence, the data transmission between the UE and the source serving eNB is not affected. And the macro eNB indicates the UE to replace the source serving eNB with a new target eNB by transmitting the handover command (the RRC reconfiguration information of the target eNB) to the UE, and transmits the information on uplink synchronization between the UE and the new target eNB. Therefore, downlink synchronization/uplink synchronization is/are established between the UE and the new target eNB, thereby efficiently reducing time delay due to uplink/downlink synchronization in the cell reconfiguration/handover process, and lowering complexity of the UE.

Embodiment 2

Figure 3:
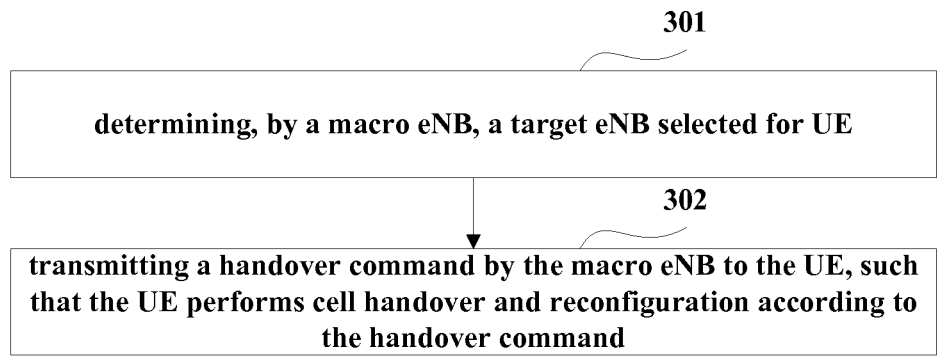
FIG. 3 is a flowchart of the method for cell handover and reconfiguration of Embodiment 2 of the present application.

An embodiment of the present application further provides a method for cell handover and reconfiguration, which is applicable to a macro eNB. FIG. 3 is a flowchart of the method. Referring to FIG. 3, the method includes:

step 301: determining, by a macro eNB, a target eNB selected for UE; and step 302: transmitting a handover command by the macro eNB to the UE, such that the UE performs cell handover and reconfiguration according to the handover command;

wherein the UE detaches from a serving eNB and reserves an uplink time adjustment parameter $N_{TA}$ of the serving eNB when the UE receives the handover command.

In an implementation of step 301, the macro eNB notifies the UE to perform cell measurement, and hence the macro eNB may select a target eNB for the UE. Therefore, step 301 may include the following steps:

S1: transmitting a cell measurement request by the macro eNB to the UE, such that the UE performs cell measurement according to the cell measurement request and reports a cell measurement result;

wherein, the measurement request may be achieved via signaling, and may also be achieved via a control instruction, and this embodiment is not limited thereto;

S2: selecting a target eNB for the UE by the macro eNB according to the cell measurement result after receiving the cell measurement result reported by the UE;

wherein, the method for performing the cell measurement by the UE is identical to that described in Embodiment 1, the contents of which being incorporated herein, which shall not be described herein any further;

wherein, the macro eNB selects the target eNB for the UE according to the measurement result of the UE, and takes the target eNB as the serving eNB of the UE; and the target eNB starts to detect an uplink signal of the UE (such as an uplink channel sounding reference signal (SRS), or an uplink data channel (PUSCH)) at a certain time according to the control of the macro eNB, so as to acquire uplink timing of the UE relative to the target eNB, and generates corresponding uplink time advance (TA) information according to the uplink timing. During this period of time, the UE still keeps normal uplink and downlink communication with the source serving eNB.

In another implementation of step 301, the source serving eNB of the UE notifies the UE to perform cell measurement, and the source serving eNB of the UE or a control cell in the same cluster as the source serving eNB of the UE may select the target eNB for the UE according to the measurement result fed back by the UE. At this moment, the macro eNB obtains the TA information of the target eNB from the source serving eNB of the UE or the control cell in the same cluster as the source serving eNB of the UE by interacting with the source serving eNB of the UE or the control cell in the same cluster as the source serving eNB of the UE. Hence, in this implementation, the macro eNB determines the target eNB selected for the UE according to the target eNB selected for the UE by the serving eNB of the UE or the control cell in the same cluster as the serving eNB of the UE In this embodiment, the macro eNB may further transmit uplink resource allocation (UL allocation/grant) information to the UE, such that the UE reports the reconfiguration completion information to the macro eNB after the reconfiguration is completed.

In this embodiment, the macro eNB may further transmit a time advance command (TAC) including the time advance (TA) information of the target eNB to the UE, such that the UE determines the uplink transmission time according to the reserved uplink time adjustment parameter of the serving eNB and the time advance information of the target eNB; wherein, the TAC may be transmitted via said handover command, may be transmitted via said uplink resource allocation information, or may be transmitted via an existing MAC command; wherein, in this embodiment, a suitable mechanism may be employed to avoid that the UE cannot identify whether the TA transmitted by the macro eNB is suitable for the macro eNB itself or for the target eNB, and a particular mechanism is not limited herein; wherein, the processing at the UE side has been described in Embodiment 1, which shall not be described herein any further.

With the method of this embodiment, when the UE is still in a state of being connected to the source serving eNB, the target eNB is made to detect the uplink signal of the UE to acquire the uplink synchronization of the UE and the target eNB. And the macro eNB indicates the UE to replace the source serving eNB with a new target eNB by transmitting the handover command (the RRC reconfiguration information of the target eNB) to the UE, and transmits the information on uplink synchronization between the UE and the new target eNB. Therefore, downlink synchronization/uplink synchronization is/are established between the UE and the new target eNB, thereby efficiently reducing time delay due to uplink/downlink synchronization in the cell reconfiguration/handover process, and lowering complexity of the UE.

Embodiment 3

Figure 4:
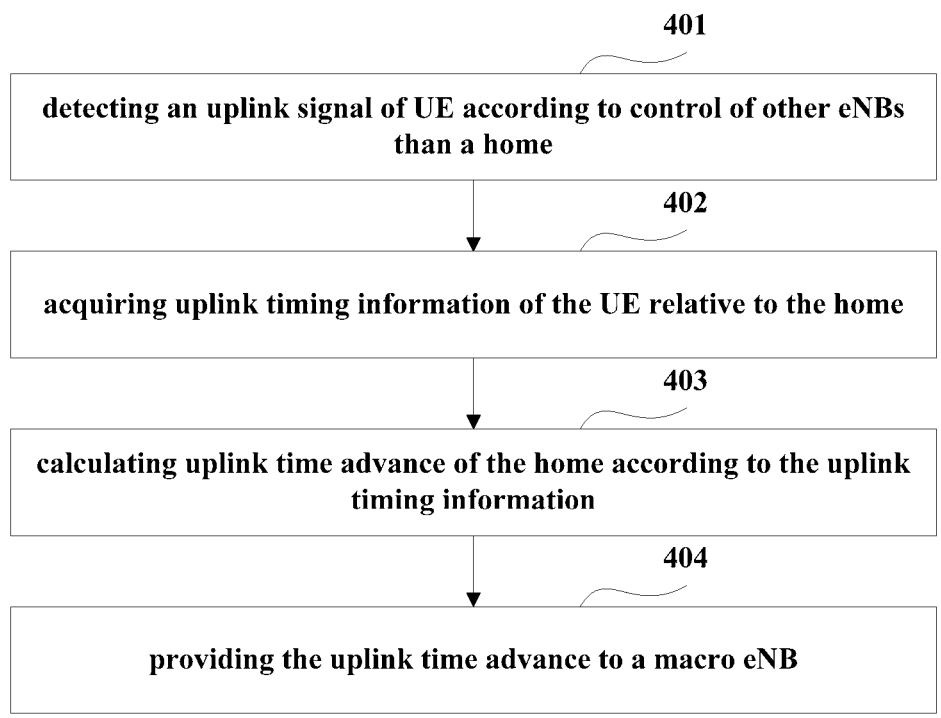
FIG. 4 is a flowchart of the method for cell handover and reconfiguration of Embodiment 3 of the present application.

An embodiment of the present application further provides a method for cell handover and reconfiguration, which is applicable to a target eNB in a process of cell handover and reconfiguration. FIG. 4 is a flowchart of the method. Referring to FIG. 4, the method includes:

step 401: detecting an uplink signal of UE according to control of other cells than a home;

wherein, if it is a macro eNB that notifies the UE to perform cell measurement and selects a target eNB for the UE according to a measurement result fed back by the UE, the macro eNB controls the target eNB to detect the uplink signal of the UE, and if it is a source serving eNB of the UE that notifies the UE to perform cell measurement and selects a target eNB for the UE according to a measurement result fed back by the UE, the source serving eNB of the UE or a control cell in the same cluster as the source serving eNB of the UE controls the target eNB to detect the uplink signal of the UE;

wherein, for example, a channel sounding reference signal (SRS), or an uplink data channel (PUSCH), may be detected, and this embodiment is not limited thereto;

step 402: acquiring uplink timing information of the UE relative to the home;

wherein, the uplink timing information of the UE relative to the home may be obtained by detecting the uplink signal of the UE;

step 403: calculating uplink time advance of the home according to the uplink timing information;

wherein, the target eNB may calculate the uplink time advance of the home with reference to a downlink clock of a serving eNB of the UE according to an $N_{TA}$ value of the source serving eNB reserved by the UE and the uplink timing information; and the target eNB may also calculate the uplink time advance of the home with reference to a downlink clock of the home (i.e. the target eNB) according to the $N_{TA}$ value of the source serving eNB reserved by the UE and the uplink timing information; wherein, the downlink clock of the target eNB may be measured by the UE and reported to the target eNB, and may also be obtained by the target eNB itself, such as the target eNB may calculate a time delay difference of downlink signals according to a receiving time delay difference of uplink signals, and hence obtain the downlink clock;

step 404: providing the uplink time advance to a macro eNB;

wherein, after the target eNB obtains the uplink time advance by detecting the uplink signal of the UE, the uplink time advance may be provide to the macro eNB by interaction, such that the macro eNB transmit it to the UE, and the UE may determine uplink transmission time for the target eNB accordingly; wherein, the method for determining the uplink transmission time for the target eNB by the UE has been described in detail in Embodiment 1, which shall not be described herein any further; wherein, in this embodiment of the present application, a suitable mechanism may be employed to avoid that the UE cannot identify whether the TA transmitted by the macro eNB is suitable for the macro eNB itself or for the target eNB, and a particular mechanism is not limited herein;

wherein, in the process of determining the TA value by the target eNB by detecting the uplink signal of the UE, the UE still keeps normal uplink and downlink communication with the source serving eNB;

wherein, as to downlink synchronization of the UE with the target eNB, it may be performed on the target eNB when the UE has not been handed over to the target eNB, and it may be performed on the target eNB after the UE receives reconfiguration information.

With the method of this embodiment, when the UE is still in a state of being connected to the source serving eNB, the target eNB is made to detect the uplink signal of the UE to acquire the uplink synchronization of the UE and the target eNB. And the macro eNB indicates the UE to replace the source serving eNB with a new target eNB by transmitting the handover command (the RRC reconfiguration information of the target eNB) to the UE, and transmits the information on uplink synchronization between the UE and the new target eNB. Therefore, downlink synchronization/uplink synchronization is/are established between the UE and the new target eNB, thereby efficiently reducing time delay due to uplink/downlink synchronization in the cell reconfiguration/handover process, and lowering complexity of the UE.

Embodiment 4

Figure 5:
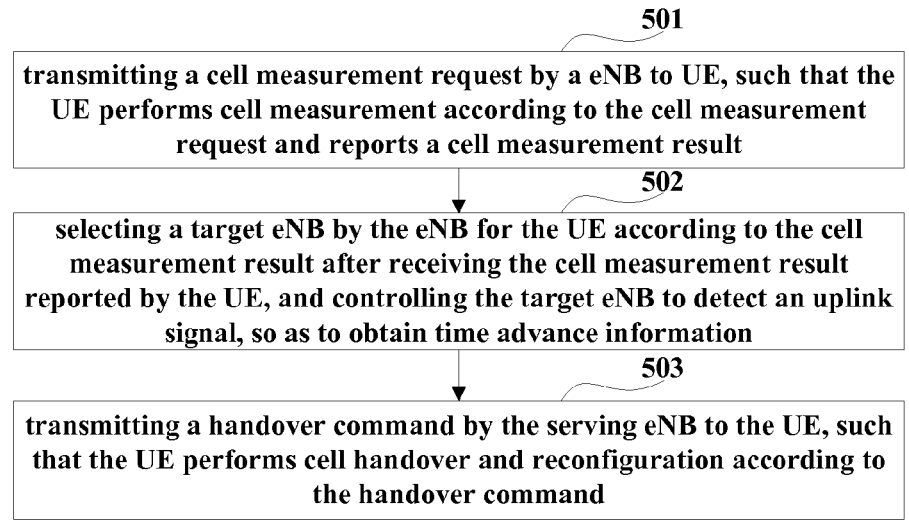
FIG. 5 is a flowchart of the method for cell handover and reconfiguration of Embodiment 4 of the present application.

An embodiment of the present application further provides a method for cell handover and reconfiguration, which is applicable to a source serving eNB of UE or a control cell or a macro eNB in the same cluster as the source serving eNB of the UE in a process of cell handover and reconfiguration. FIG. 5 is a flowchart of the method. Referring to FIG. 5, the method includes:

step 501: transmitting a cell measurement request by an eNB to UE, such that the UE performs cell measurement according to the cell measurement request and reports a cell measurement result;

wherein, the eNB here may be a macro eNB, as described in Embodiment 2, and may also be a source serving eNB of the UE; and the macro eNB or the source serving eNB of the UE may notify the UE to perform cell measurement, so as to select a target eNB for the UE according to a measurement result reported by the UE; and wherein, the method of measurement by the UE has been described in detail in Embodiment 1, which shall not be described herein any further;

step 502: selecting a target eNB by the eNB for the UE according to the cell measurement result after receiving the cell measurement result reported by the UE, and controlling the target eNB to detect an uplink signal, so as to obtain time advance information;

wherein, the eNB is a serving eNB of the UE or a macro eNB or a control cell in the same cluster as the serving eNB of the UE. The eNB obtains an uplink TA value by controlling the target eNB to detect the uplink signal of the UE, such that the UE calculates uplink transmission time for the target eNB accordingly.

In an implementation, when the method is applied to a serving eNB, the method may further include:

step 503: transmitting a handover command by the serving eNB to the UE, such that the UE performs cell handover and reconfiguration according to the handover command;

wherein, the handover command may include TA information of the target eNB, such that the UE determines the uplink transmission time according to the TA information of the target eNB and a reserved $N_{TA}$ of the target eNB. The detailed process has been described in the above embodiments, which shall not be described herein any further.

With the method of this embodiment, when the UE is still in a state of being connected to the source serving eNB, the target eNB is made to detect the uplink signal of the UE to acquire the uplink synchronization of the UE and the target eNB. And the macro eNB indicates the UE to replace the source serving eNB with a new target eNB by transmitting the handover command (the RRC reconfiguration information of the target eNB) to the UE, and transmits the information on uplink synchronization between the UE and the new target eNB. Therefore, downlink synchronization/uplink synchronization is/are established between the UE and the new target eNB, thereby efficiently reducing time delay due to uplink/downlink synchronization in the cell reconfiguration/handover process, and lowering complexity of the UE.

The methods of the embodiments of the present application are described in embodiments 1-4 from respective angles of the UE, the macro eNB, the target eNB and the serving eNB taking that UE in a wireless communication system performs cell handover and reconfiguration as an example. For more clear and easy to be understood, the methods of the embodiments shall be describe below with reference to a schematic diagram of information interaction between apparatuses.

Figure 6:
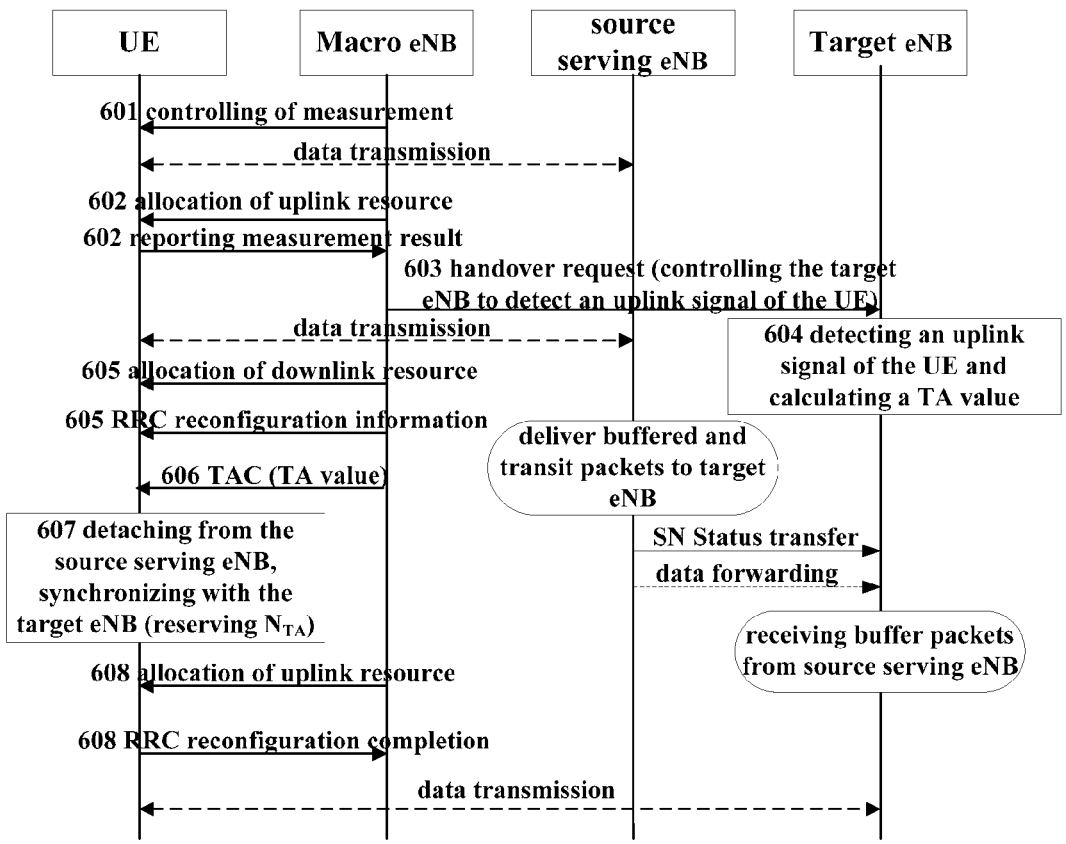
FIG. 6 is a schematic diagram of information interaction between the apparatuses related to embodiments 1-4.

FIG. 6 is a schematic diagram of information interaction between the apparatuses (UE, a macro eNB, a source serving eNB and a target eNB) in a process of performing cell handover and reconfiguration by the UE. Referring to FIG. 6, the process of interaction includes:

step 601: the macro eNB controls the UE to perform cell measurement;

wherein, it may also be the serving eNB of the UE to control the UE to perform cell measurement;

step 602: the macro eNB allocates an uplink resource for the UE, and the UE reports a measurement result to the macro eNB by using the uplink resource;

wherein, it may also be the serving eNB of the UE to allocate an uplink resource for the UE, and the UE reports a measurement result to its serving eNB;

step 603: the macro eNB controls the target eNB to detect an uplink signal of the UE;

wherein, when the source serving eNB of the UE or a control cell in the same cluster as its source serving eNB selects a target eNB for the UE according to the measurement result, the source serving eNB of the UE or the control cell in the same cluster as its source serving eNB controls the target eNB to detect an uplink signal of the UE;

step 604: the target eNB detects an uplink signal of the UE and calculates a TA value;

step 605: the macro eNB allocates a downlink resource for the UE, and transmits a handover command (RRC reconfiguration information) to the UE in the allocated downlink resource;

wherein, it may also be the serving eNB of the UE to allocate the downlink resource for the UE, and transmit the handover command to the UE;

step 606: the macro eNB transmits a TAC (containing a TA value of the target eNB) to the UE;

wherein, the TA value in the TAC is a TA value of the target eNB obtained by the macro eNB by interacting with the target eNB; and wherein, the TA value may also be transmitted via the handover command in step 605, or transmitted via the uplink resource allocation information in step 609;

step 607: the UE detaches from the source serving eNB, synchronizes with the target eNB, and reserves an $N_{TA}$ of the source serving eNB at the same time, so as to determine uplink transmission time; and step 608: the macro eNB allocates an uplink resource for the UE, such that the UE reports RRC reconfiguration completion information to the macro eNB by using the uplink resource;

wherein, it may also be the target eNB to allocate the uplink resource for the UE, such that the UE reports the RRC reconfiguration completion information to the target eNB; in this embodiment, an order of steps 606 and 608 is not limited.

In this embodiment, as to downlink synchronization of the UE with the target eNB, it may be performed on the target eNB when the UE has not been handed over to the target eNB, and it may be performed on the target eNB after the UE receives reconfiguration information.

In this embodiment, if the source serving eNB, the target eNB and the backhaul of the macro eNB are ideal, such as the source serving eNB, the target eNB and the macro eNB being connected to the same eNB, it may be deemed that there exists no time delay in the interacted information between the eNBs.

An embodiment of the present application further provides UE, as described in Embodiment 5 below. As the principle of the UE for solving problems is similar to the method in Embodiment 1, the implementation of the method in Embodiment 1 is referred to for the implementation of the UE, and the repeated parts shall not be described any further.

Embodiment 5

Figure 7:
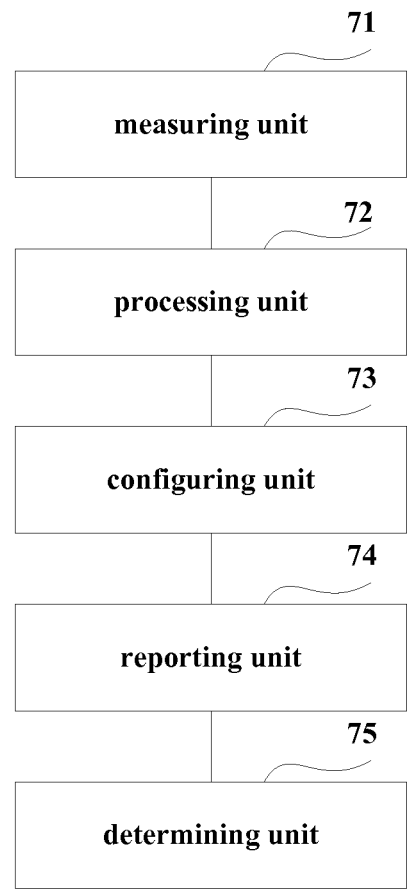
FIG. 7 is a schematic diagram of the structure of the UE of Embodiment 5 of the present application.

An embodiment of the present application further provides UE. FIG. 7 is a schematic diagram of the structure of the UE. Referring to FIG. 7, the UE includes:

a measuring unit 71 configured to perform cell measurement according to a cell measurement request and report a measurement result;

a processing unit 72 configured to detach from a source serving eNB and reserve an uplink time adjustment parameter $N_{TA}$ of the source serving eNB after receiving a handover command transmitted by a macro eNB or the source serving eNB; and a configuring unit 73 configured to perform cell handover and reconfiguration according to the handover command;

wherein, the UE may further include:

a reporting unit 74 configured to feed reconfiguration completion information back to the macro eNB or a target eNB according to uplink resource allocation information when the UE receives the uplink resource allocation information transmitted by the macro eNB or the target eNB;

wherein, the UE may further include:

a determining unit 75 configured to determine uplink transmission time according to the uplink time adjustment parameter and TA information of the target eNB when the UE receives a time advance command containing the TA information of the target eNB;

wherein, if the UE receives the handover command from the macro eNB, the uplink time advance command may be transmitted via the handover command, or transmitted via the uplink resource allocation information, or transmitted via existing MAC signaling; and if the UE receives the handover command from a source serving eNB, the time advance command is transmitted via the handover command;

wherein, if reconfiguration completion information is fed back to the target eNB, uplink transmission time needs to be determined first by the determining unit 75, and then the reconfiguration completion information is fed back to the target eNB at the determined uplink transmission time;

wherein, the uplink transmission time $N_{TA\_new} = N_{TA\_old} + TA$; where, $N_{TA\_old}$ is an $N_{TA}$ value of the serving eNB reserved by the UE, and TA is a TA value in the received TA information; more broadly, $N_{TA\_old}$ is an $N_{TA}$ value before receiving a new TA command being received, and $N_{TA\_new}$ is an $N_{TA}$ value for updating $N_{TA\_old}$ after receiving the TA command;

wherein, the determining unit 75 may take a sampling point advanced by $N_{TA\_new}$ as the uplink transmission time according to downlink timing information of the target eNB for transmitting an uplink signal, $N_{TA\_new}$ being equal to the $N_{TA}$ value of the source serving eNB reserved by the UE plus a TA value that is received by the UE for the last time;

wherein, the determining unit 75 may also take the sampling point advanced by $N_{TA\_new}$ as the uplink transmission time with reference to downlink timing information of the source serving eNB for transmitting an uplink signal when the UE receives a first time advance command, $N_{TA\_new}$ being equal to the $N_{TA}$ value of the source serving eNB reserved by the UE plus the TA value, and take the sampling point advanced by $N_{TA}$ as the uplink transmission time with reference to downlink timing information of the target eNB for transmitting an uplink signal when the UE receives other time advance commands than the first time advance command, $N_{TA\_new}$ being equal to the $N_{TA-OLD}$ value plus the received TA value. And the determining unit 75 may further take a sampling point advanced by $N_{TA\_new}+\Delta t$ as the uplink transmission time with reference to the downlink timing information of the target eNB according to a downlink timing difference $\Delta t$ obtained through measurement for transmitting an uplink signal when the UE receives a first time advance command, and take the sampling point advanced by $N_{TA\_new}$ as the uplink transmission time for transmitting an uplink signal when the UE receives other time advance commands than the first time advance command.

With the UE of this embodiment, the UE replaces the source serving eNB with a new target eNB according to the handover command of the macro eNB or the source serving eNB, and transmits the information on uplink synchronization between the UE and the new target eNB. Therefore, as the UE is still in a state of being connected to the source serving eNB, the target eNB detects the uplink signal of the UE to acquire uplink synchronization between the UE and the target eNB, such that the UE establishes downlink synchronization/uplink synchronization with the new target eNB, thereby efficiently reducing time delay due to uplink/downlink synchronization in the cell reconfiguration/handover process, and lowering complexity of the UE.

An embodiment of the present application further provides a macro eNB, as described in Embodiment 6 below. As the principle of the macro eNB for solving problems is similar to the method in Embodiment 2, the implementation of the method in Embodiment 2 is referred to for the implementation of the macro eNB, and the repeated parts shall not be described any further.

Embodiment 6

Figure 8:
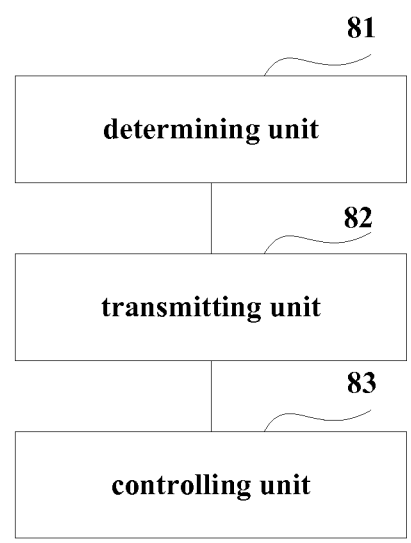
FIG. 8 is a schematic diagram of the structure of the macro eNB of Embodiment 6 of the present application.

An embodiment of the present application further provides a macro eNB. FIG. 8 is a schematic diagram of the structure of the macro eNB. Referring to FIG. 8, the macro eNB includes:

a determining unit 81 configured to determine a target eNB selected for UE; and a transmitting unit 82 configured to transmit a handover command to the UE, such that the UE performs cell handover and reconfiguration according to the handover command;

wherein the UE detaches from its serving eNB and reserves an uplink time adjustment parameter $N_{TA}$ of a source serving eNB after receiving the handover command.

In an embodiment, the transmitting unit 82 further transmits a cell measurement request to the UE, such that the UE performs cell measurement according to the cell measurement request and reports a cell measurement result. And the determining unit 81 selects the target eNB for UE according to the measurement result reported by the UE.

In another embodiment, the determining unit 81 determines the target eNB selected for the UE according to a target eNB selected for the UE by the serving eNB of the UE or a control cell in the same cluster as the serving eNB of the UE.

In an embodiment, the macro eNB further includes:

a controlling unit 83 configured to, after the determining unit 81 determines the target eNB of the UE, control the target eNB to detect an uplink signal, so as to obtain uplink time advance information.

In an embodiment, the transmitting unit 82 may further transmit uplink resource allocation information to the UE, such that the UE reports reconfiguration completion information after the RRC reconfiguration is completed.

In an embodiment, the transmitting unit 82 may further transmit a time advance command containing TA information of the target eNB to the UE via the handover command, such that the UE determines the uplink transmission time according to the reserved uplink time adjustment parameter and the time advance information of the target eNB.

In another embodiment, the transmitting unit 82 may further transmit the time advance command containing the TA information of the target eNB to the UE via the uplink resource allocation information, such that the UE determines the uplink transmission time according to the reserved uplink time adjustment parameter and the time advance information of the target eNB.

In still another embodiment, the transmitting unit 82 may further transmit the time advance command containing the TA information of the target eNB to the UE via existing MAC signaling, such that the UE determines the uplink transmission time according to the reserved uplink time adjustment parameter and the time advance information of the target eNB.

With the macro eNB of this embodiment, when the UE is still in a state of being connected to the source serving eNB, the macro eNB controls the target eNB to detect the uplink signal of the UE to acquire uplink synchronization between the UE and the target eNB, informs the UE to replace the source serving eNB with a new target eNB, and transmits the information on uplink synchronization between the UE and the new target eNB. Therefore, as the UE is made to establish downlink synchronization/uplink synchronization with the new target eNB, time delay due to uplink/downlink synchronization in the cell reconfiguration/handover process is efficiently reduced, and complexity of the UE is lowered.

An embodiment of the present application further provides a target eNB, as described in Embodiment 7 below. As the principle of the target eNB for solving problems is similar to the method in Embodiment 3, the implementation of the method in Embodiment 3 is referred to for the implementation of the target eNB, and the repeated parts shall not be described any further.

Embodiment 7

Figure 9:
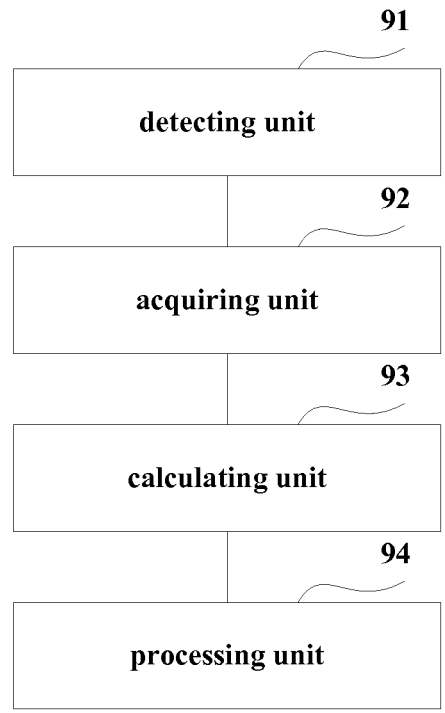
FIG. 9 is a schematic diagram of the structure of the target eNB of Embodiment 7 of the present application.

An embodiment of the present application further provides an eNB. FIG. 9 is a schematic diagram of the structure of the eNB. Referring to FIG. 9, the eNB includes:

a detecting unit 91 configured to detect an uplink signal of UE according to control of other cells than a home;

an acquiring unit 92 configured to acquire uplink timing information of the UE relative to the home;

a calculating unit 93 configured to calculate uplink time advance of the home according to the uplink timing information; and a processing unit 94 configured to provide the uplink time advance to a macro eNB.

In an embodiment, the calculating unit 93 may calculate the uplink time advance of the home with reference to a downlink clock of a serving eNB of the UE according to an $N_{TA}$ value of the serving eNB reserved by the UE and the uplink timing information.

In another embodiment, the calculating unit 93 may calculate the uplink time advance of the home with reference to a downlink clock of the home according to the $N_{TA}$ value of the serving eNB reserved by the UE and the uplink timing information. In this embodiment, the calculating unit 93 may acquire the downlink clock of the home from the UE via the acquiring unit 92, and may also determine the downlink clock of the home according to a received signal time delay difference.

With the target eNB of this embodiment, when the UE is still in a state of being connected to the source serving eNB, the target eNB detects the uplink signal of the UE under the control of another cell to acquire uplink synchronization between the UE and the target eNB, and transmit the information on uplink synchronization between the UE and the new target eNB. Therefore, as the UE is made to establish downlink synchronization/uplink synchronization between the UE and the new target eNB, time delay due to uplink/downlink synchronization in the cell reconfiguration/handover process is efficiently reduced, and complexity of the UE is lowered.

An embodiment of the present application further provides an eNB, as described in Embodiment 8 below. As the principle of the eNB for solving problems is similar to the method in Embodiment 4, the implementation of the method in Embodiment 4 is referred to for the implementation of the eNB, and the repeated parts shall not be described any further.

Embodiment 8

Figure 10:
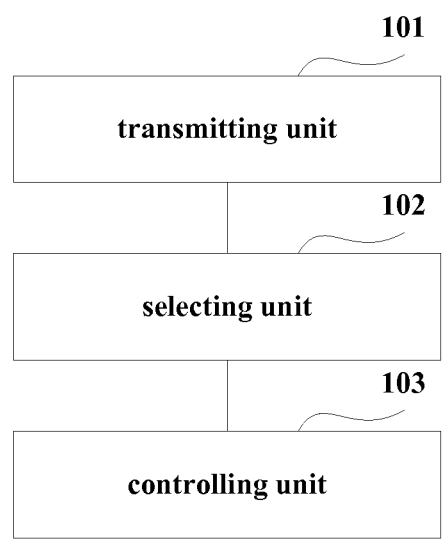
FIG. 10 is a schematic diagram of the structure of the serving eNB of Embodiment 8 of the present application.

An embodiment of the present application further provides an eNB. FIG. 10 is a schematic diagram of the structure of the eNB. Referring to FIG. 10, the eNB includes:

a transmitting unit 101 configured to transmit a cell measurement request to UE, such that the UE performs cell measurement according to the cell measurement request and reports a cell measurement result;

a selecting unit 102 configured to select a target eNB for the UE according to the cell measurement result after receiving the cell measurement result reported by the UE; and a controlling unit 103 configured to control the target eNB to detect an uplink signal of the UE, so as to obtain uplink time advance information;

wherein, the eNB may be a serving eNB of the UE, or a macro eNB.

An embodiment of the present application further provides a control cell, which is in the same cluster as the source serving eNB of the UE. In this embodiment, the control cell obtains a cell measurement result of the UE from the source serving eNB of the UE or the macro eNB, selects a target eNB for the UE by via the selecting unit 102, and controls the target eNB by via the controlling unit 103 to detect an uplink signal of the UE, so as to obtain uplink time advance information.

With the eNB of this embodiment, when the UE is still in a state of being connected to the source serving eNB, the eNB controls the target eNB to detect the uplink signal of the UE to acquire uplink synchronization between the UE and the target eNB, and transmit the information on uplink synchronization between the UE and the new target eNB. Therefore, as the UE is made to establish downlink synchronization/uplink synchronization with the new target eNB, time delay due to uplink/downlink synchronization in the cell reconfiguration/handover process is efficiently reduced, and complexity of the UE is lowered.

An embodiment of the present application further provides a method for cell handover and reconfiguration, which is different from the methods in embodiments 1-4 in that in the method of this embodiment, there exists no participation of a macro eNB, while a serving eNB of UE notifies the UE to perform cell measurement and report a measurement result, the serving eNB of the UE selects a target eNB for the UE according to the measurement result reported by the UE, and controls the target eNB to detect an uplink signal of the UE, so as to obtain an uplink TA value; and the serving eNB of the UE transmits a handover command (RRC reconfiguration information of the target eNB) to the UE, and the target eNB of the UE transmits uplink resource allocation information to the UE; wherein, the handover command or the uplink resource allocation information may include a TA value of the target eNB, and the TA value of the target eNB may further be transmitted via existing MAC signaling. In the following description, contents identical to those in embodiments 1-4 shall not be described any further.

Embodiment 9

Figure 11:
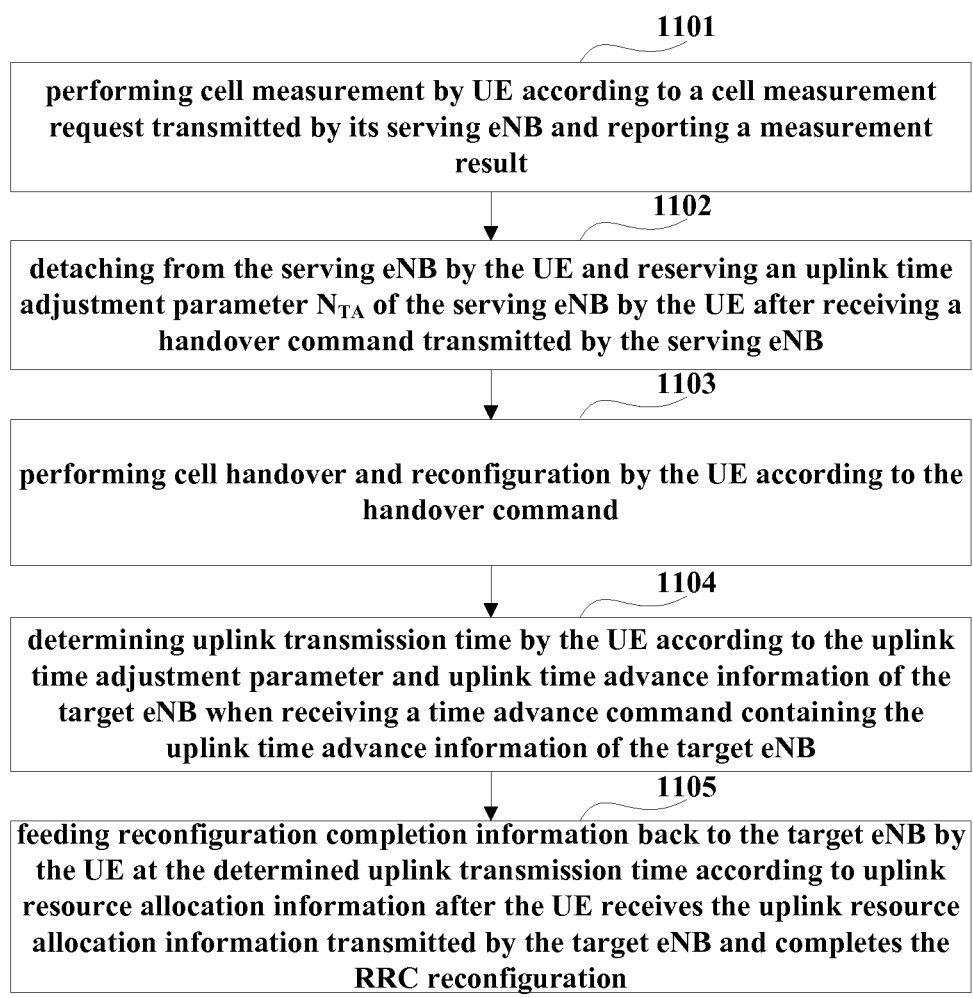
FIG. 11 is a flowchart of the method for cell handover and reconfiguration of Embodiment 9 of the present application.

An embodiment of the present application further provides a method for cell handover and reconfiguration. FIG. 11 is a flowchart of the method. Referring to FIG. 11, the method includes:

step 1101: performing cell measurement by UE according to a cell measurement request transmitted by its serving eNB and reporting a measurement result;

step 1102: detaching from the serving eNB by the UE and reserving an uplink time adjustment parameter $N_{TA}$ of the serving eNB by the UE after receiving a handover command (RRC reconfiguration information of a target eNB) transmitted by the serving eNB; and step 1103: performing cell handover and reconfiguration by the UE according to the handover command;

wherein, the UE may perform the cell handover and reconfiguration by using existing means, and this embodiment of the present application is not limited thereto; and in the process of handover, the source serving eNB will deliver buffered and transit packets to a target eNB and transfer sequence number statuses (SN statuses) to the target eNB, and then forward data to the target eNB, and the target eNB may receive the buffer packets from the source serving eNB.

In an embodiment, the method further includes:

step 1104: determining uplink transmission time by the UE according to the uplink time adjustment parameter and uplink time advance information of the target eNB when receiving a time advance command containing the uplink time advance information of the target eNB.

In an embodiment, the method further includes:

step 1105: feeding reconfiguration completion information back to the target eNB by the UE at the determined uplink transmission time according to uplink resource allocation information after the UE receives the uplink resource allocation information transmitted by the target eNB and completes the RRC reconfiguration;

wherein, the time advance command may be transmitted by the serving eNB via the handover command, and may also be transmitted by the target eNB via the uplink resource allocation information. If the TA command is transmitted via the uplink resource allocation information, the UE first receives the uplink resource allocation information, then determines the uplink transmission time, and finally feeds the reconfiguration completion information back to the target eNB at the determined uplink transmission time;

wherein, the uplink transmission time $N_{TA\_new}=N_{TA\_old}+$ TA; where, $N_{TA\_old}$ is an $N_{TA}$ value of the serving eNB reserved by the UE, and TA is a TA value in the received TA information of the target eNB; more broadly, $N_{TA\_old}$ is an $N_{TA}$ value before receiving a new TA command, and $N_{TA\_new}$ is an $N_{TA}$ value for updating $N_{TA\_old}$ after receiving the TA command.

In particular, the UE may take a sampling point advanced by $N_{TA\_new}$ as the uplink transmission time with reference to downlink timing information of the target eNB for transmitting an uplink signal, $N_{TA\_new}$ being equal to the $N_{TA}$ value of the source serving eNB reserved by the UE plus a TA value that is received by the UE for the last time; wherein, the UE may also take the sampling point advanced by $N_{TA\_new}$ as the uplink transmission time with reference to reserved downlink timing information of the serving eNB for transmitting an uplink signal when receiving a first time advance command, $N_{TA\_new}$ being equal to the $N_{TA}$ value of the source serving eNB reserved by the UE plus the TA value, and take the sampling point advanced by $N_{TA\_new}$ as the uplink transmission time with reference to downlink timing information of the target eNB for transmitting an uplink signal when receiving other time advance commands than the first time advance command, $N_{TA\_new}$ being equal to the $N_{TA\text{-}old}$ value plus the received TA value. And the UE may further take a sampling point advanced by $N_{TA\_new}+\Delta t$ as the uplink transmission time with reference to the downlink timing information of the target eNB according to a downlink timing difference $\Delta t$ obtained through measurement for transmitting an uplink signal when receiving a first time advance command, and take the sampling point advanced by $N_{TA\_new}$ as the uplink transmission time for transmitting an uplink signal when receiving other time advance commands than the first time advance command.

In this embodiment, similar to Embodiment 1, an order of executing the steps is not limited, and is determined according to an actual situation in implementation.

With the method of this embodiment, when the UE is still in a state of being connected to the source serving eNB, the target eNB selected by its source serving eNB begins to detect its uplink signal to determine uplink time advance between the UE and the target eNB, and the UE replaces the source serving eNB with a new target eNB according to the handover command of its serving eNB. Therefore, as the UE is made to establish downlink synchronization/uplink synchronization with the new target eNB, time delay due to uplink/downlink synchronization in the cell reconfiguration/handover process is efficiently reduced, and complexity of the UE is lowered.

Embodiment 10

Figure 12:
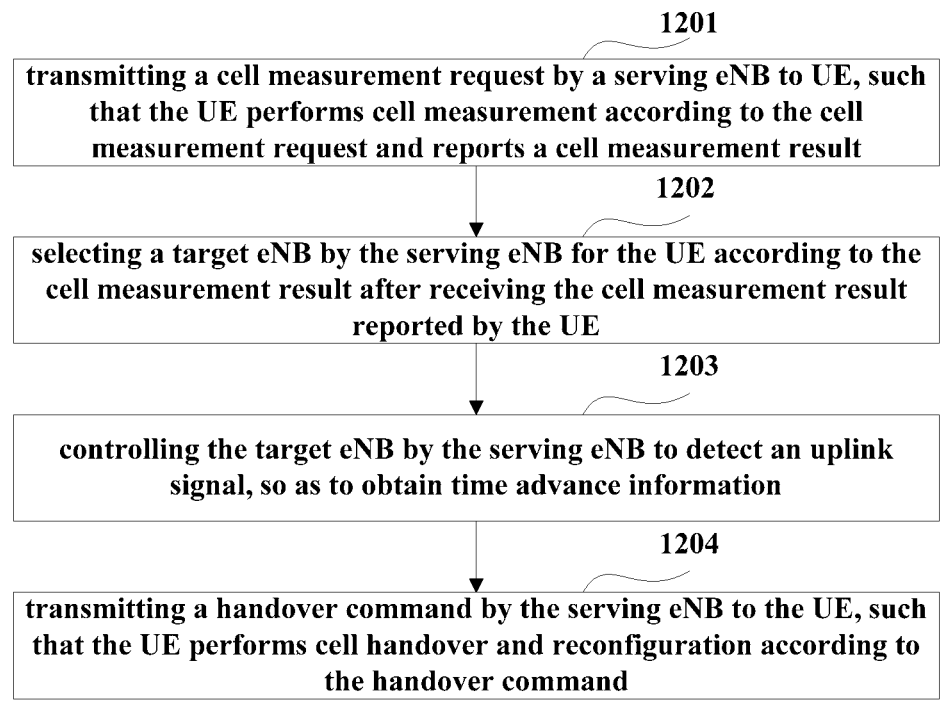
FIG. 12 is a flowchart of the method for cell handover and reconfiguration of Embodiment 10 of the present application.

An embodiment of the present application further provides a method for cell handover and reconfiguration. FIG. 12 is a flowchart of the method. Referring to FIG. 12, the method includes:

step 1201: transmitting a cell measurement request by a serving eNB to UE, such that the UE performs cell measurement according to the cell measurement request and reports a cell measurement result;

step 1202: selecting a target eNB by the serving eNB for the UE according to the cell measurement result after receiving the cell measurement result reported by the UE; and step 1203: controlling the target eNB by the serving eNB to detect an uplink signal, so as to obtain time advance information.

In an embodiment, the method further includes:

step 1204: transmitting a handover command by the serving eNB to the UE, such that the UE performs cell handover and reconfiguration according to the handover command;

wherein, the UE detaches from its serving eNB and reserves an uplink time adjustment parameter $N_{TA}$ of the serving eNB after receiving the handover command.

In this embodiment, the handover command may contain a time advance command, the time advance command including uplink time advance information (a TA value) of the target eNB, such that the UE determines uplink transmission time according to the uplink time adjustment parameter $N_{TA}$ reserved by the UE and the uplink time advance information (the TA value) of the target eNB.

With the method of this embodiment, when the UE is still in a state of being connected to the serving eNB, the serving eNB controls the target eNB selected for the UE to detect an uplink signal of the UE to determine uplink time advance between the UE and the target eNB, and the serving eNB of the UE further indicates the UE to replace the source serving eNB with a new target eNB. Therefore, as the UE is made to establish downlink synchronization/uplink synchronization between the UE and the new target eNB, time delay due to uplink/downlink synchronization in the cell reconfiguration/handover process is efficiently reduced, and complexity of the UE is lowered.

Embodiment 11

Figure 13:
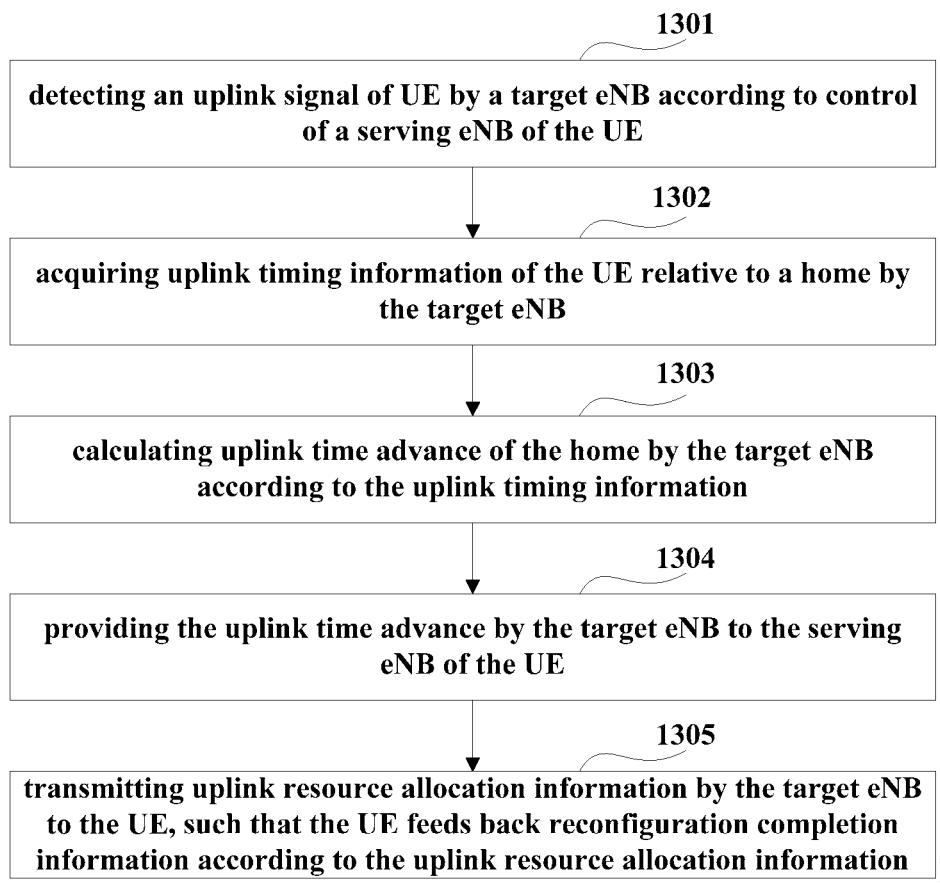
FIG. 13 is a flowchart of the method for cell handover and reconfiguration of Embodiment 11 of the present application.

An embodiment of the present application further provides a method for cell handover and reconfiguration. FIG. 13 is a flowchart of the method. Referring to FIG. 13, the method includes:

step 1301: detecting an uplink signal of UE by a target eNB according to control of a serving eNB of the UE;

step 1302: acquiring uplink timing information of the UE relative to a home by the target eNB;

step 1303: calculating uplink time advance of the home by the target eNB according to the uplink timing information; and step 1304: providing the uplink time advance by the target eNB to the serving eNB of the UE.

In step 1303, the target eNB may calculate the uplink time advance of the home with reference to a downlink clock of the serving eNB of the UE according to an $N_{TA}$ value of the serving eNB reserved by the UE and the uplink timing information.

In step 1303, the target eNB may also calculate the uplink time advance of the home with reference to a downlink clock of the home according to the $N_{TA}$ value of the serving eNB reserved by the UE and the uplink timing information; wherein, the downlink clock of the home may be acquired by the target eNB from the UE, and may also be determined by the target eNB according to a received signal time delay difference, which is as described in Embodiment 3, and shall not be described herein any further.

In an embodiment, the method further includes:

step 1305: transmitting uplink resource allocation information by the target eNB to the UE, such that the UE feeds back reconfiguration completion information according to the uplink resource allocation information.

In this embodiment, the uplink resource allocation information may contain a time advance command, the time advance command including uplink time advance information of the target eNB, such that the UE determines uplink transmission time according to the reserved uplink time adjustment parameter and the uplink time advance information of the target eNB.

With the method of this embodiment, when the UE is still in a state of being connected to the source serving eNB, the target eNB selected by its serving eNB begins to detect its uplink signal to determine uplink time advance between the UE and the target eNB, and the UE replaces the source serving eNB with a new target eNB according to the indication of its serving eNB. Therefore, as the UE is made to establish downlink synchronization/uplink synchronization between the UE and the new target eNB, time delay due to uplink/downlink synchronization in the cell reconfiguration/handover process is efficiently reduced, and complexity of the UE is lowered.

The methods of the embodiments of the present application are described in embodiments 9-11 from respective angles of the UE, the serving eNB and the target eNB taking that UE in a wireless communication system performs cell handover and reconfiguration as an example. For more clear and easy to be understood, the methods of the embodiments shall be describe below with reference to a schematic diagram of information interaction between apparatuses.

Figure 14:
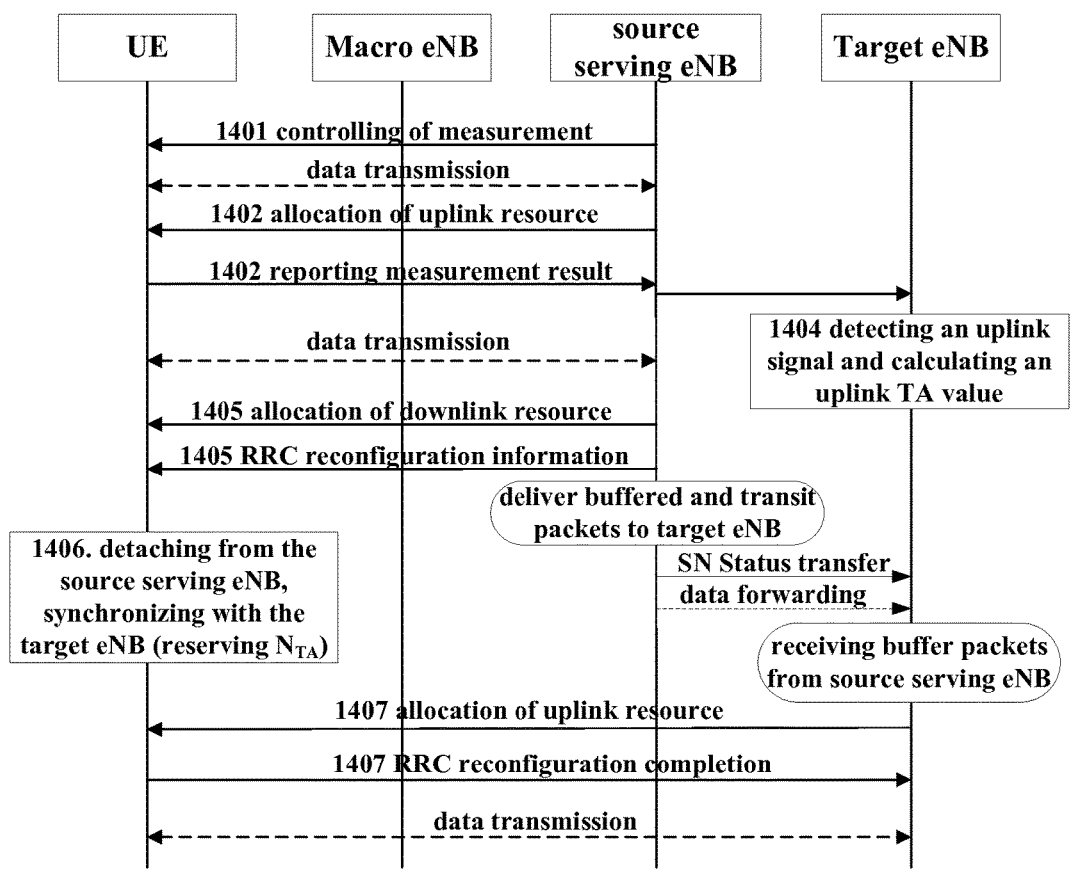
FIG. 14 is a schematic diagram of information interaction of the apparatuses related to embodiments 9-11.

FIG. 14 is a schematic diagram of information interaction between the apparatuses (UE, a serving eNB and a target eNB) in a process of performing cell handover and reconfiguration by the UE. Referring to FIG. 14, the process of interaction includes:

step 1401: the source serving eNB of the UE controls the UE to perform cell measurement;

step 1402: the source serving eNB allocates an uplink resource for the UE, such that the UE reports a measurement result to the serving eNB by using the uplink resource;

step 1403: the source serving eNB of the UE controls the target eNB to detect an uplink signal of the UE;

wherein, it may also be a control cell in the same cluster as the source serving eNB of the UE to control the target eNB to detect an uplink signal of the UE;

step 1404: the target eNB detects an uplink signal of the UE and calculates a TA value;

step 1405: the source serving eNB of the UE allocates a downlink resource for the UE and transmits RRC reconfiguration information to the UE in the allocated downlink resource;

wherein, the source serving eNB of the UE may transmit TA information to the UE via the same signaling at the same time;

step 1406: the UE detaches from the source serving eNB and synchronizes with the target eNB, and reserves an $N_{TA}$ of the source serving eNB, so as to determine uplink transmission time; and step 1407: the target eNB allocates an uplink resource for the UE, such that the UE reports RRC reconfiguration completion information to the target eNB by using the uplink resource;

wherein, the target eNB may transmit TA information to the UE via the same signaling.

In this embodiment, if a backhaul between the source serving eNB and the target eNB is ideal, but time delay of a backhaul between small eNBs (the source serving eNB and the target eNB) and a macro eNB is relatively large, for example, the source serving eNB and the target eNB are connected to the same eNB, and the macro eNB is connected to another eNB, it may be deemed that there exists no time delay in the interacted information between the small eNBs, and there exists time delay in the interacted information between the small eNBs and the macro eNB.

An embodiment of the present application further provides UE, as described in Embodiment 12 below. As the principle of the UE for solving problems is similar to the method in Embodiment 9, the implementation of the method in Embodiment 9 is referred to for the implementation of the UE, and the repeated parts shall not be described any further.

Embodiment 12

Figure 15:
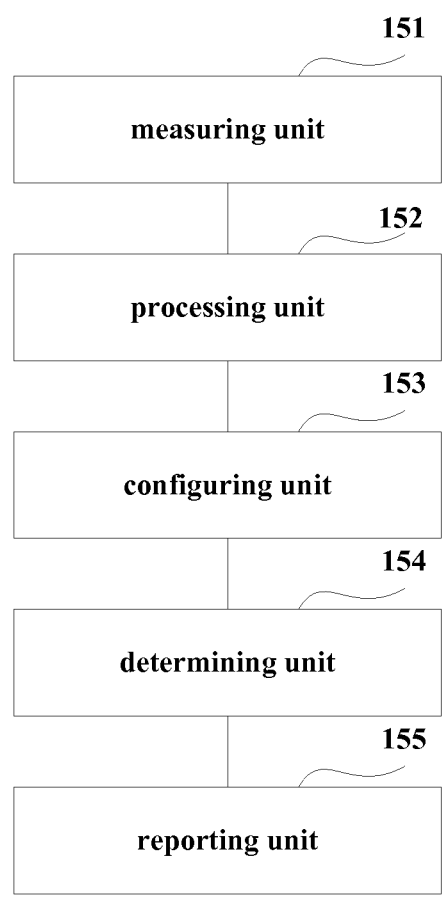
FIG. 15 is a schematic diagram of the structure of the UE of Embodiment 12 of the present application.

An embodiment of the present application further provides UE. FIG. 15 is a schematic diagram of the structure of the UE. Referring to FIG. 15, the UE includes:

a measuring unit 151 configured to perform cell measurement according to a cell measurement request of a serving eNB and report a cell measurement result;

a processing unit 152 configured to detach from the serving eNB and reserve an uplink time adjustment parameter $N_{TA}$ of the serving eNB when receiving a handover command transmitted by the serving eNB; and a configuring unit 153 configured to perform cell handover and reconfiguration according to the handover command.

In an embodiment, the UE further includes:

a determining unit 154 configured to determine uplink transmission time according to the uplink time adjustment parameter and uplink time advance information of the target eNB when receiving a time advance command containing the uplink time advance information of the target eNB.

In an embodiment, the UE further includes:

a reporting unit 155 configured to feed reconfiguration completion information back to the target eNB after completing the RRC reconfiguration when receiving the uplink resource allocation information transmitted by the target eNB;

wherein, the uplink time advance information may be transmitted via the handover command, and may also be transmitted via the uplink resource allocation information. If the TA command is transmitted via the uplink resource allocation information, the UE first receives the uplink resource allocation information, then determines the uplink transmission time, and finally feeds the reconfiguration completion information back to the target eNB at the determined uplink transmission time;

wherein, the uplink transmission time $N_{TA\_new} = N_{TA\_old} +$ TA; where, $N_{TA\_old}$ is an $N_{TA}$ value of the serving eNB reserved by the UE, and TA is a TA value in the received TA information of the target eNB; more broadly, $N_{TA\_old}$ is an $N_{TA}$ value before receiving a new TA command, and $N_{TA\_new}$ is an $N_{TA}$ value for updating $N_{TA\_old}$ after receiving the TA command.

In particular, the UE may take a sampling point advanced by $N_{TA\_new}$ as the uplink transmission time with reference to downlink timing information of the target eNB for transmitting an uplink signal, $N_{TA\_new}$ being equal to the $N_{TA}$ value of the source serving eNB reserved by the UE plus a TA value that is received by the UE for the last time. The UE may also take the sampling point advanced by $N_{TA\_new}$ as the uplink transmission time with reference to reserved downlink timing information of the serving eNB for transmitting an uplink signal when receiving a first time advance command, $N_{TA\_new}$ being equal to the $N_{TA}$ value of the source serving eNB reserved by the UE plus the TA value, and take the sampling point advanced by $N_{TA\_new}$ as the uplink transmission time with reference to downlink timing information of the target eNB for transmitting an uplink signal when receiving other time advance commands than the first time advance command, $N_{TA\_new}$ being equal to the $N_{TA\text{-}old}$ value plus the received TA value. And the UE may further take a sampling point advanced by $N_{TA\_new}+\Delta t$ as the uplink transmission time with reference to the downlink timing information of the target eNB according to a downlink timing difference $\Delta t$ obtained through measurement for transmitting an uplink signal when the UE receives a first time advance command, and take the sampling point advanced by $N_{TA\_new}$ as the uplink transmission time for transmitting an uplink signal when the UE receives other time advance commands than the first time advance command.

With the UE of this embodiment, when the UE is still in a state of being connected to the source serving eNB, the target eNB selected by its serving eNB begins to detect its uplink signal to determine uplink time advance between the UE and the target eNB, and the UE replaces the source serving eNB with a new target eNB according to the handover command of its serving eNB. Therefore, as the UE is made to establish downlink synchronization/uplink synchronization between the UE and the new target eNB, time delay due to uplink/downlink synchronization in the cell reconfiguration/handover process is efficiently reduced, and complexity of the UE is lowered.

An embodiment of the present application further provides a serving eNB, as described in Embodiment 13 below. As the principle of the serving eNB for solving problems is similar to the method in Embodiment 10, the implementation of the method in Embodiment 10 is referred to for the implementation of the serving eNB, and the repeated parts shall not be described any further.

Embodiment 13

Figure 16:
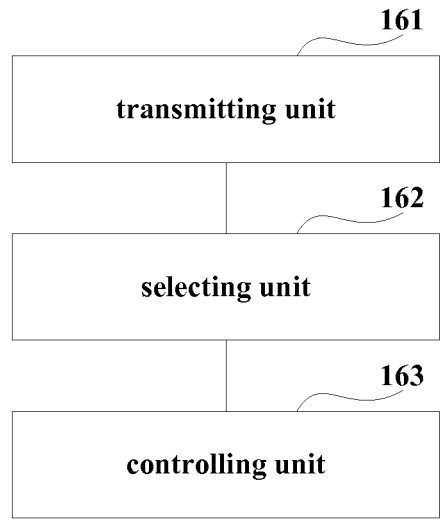
FIG. 16 is a schematic diagram of the structure of the serving eNB of Embodiment 13 of the present application.

An embodiment of the present application further provides an eNB. FIG. 16 is a schematic diagram of the structure of the eNB. Referring to FIG. 16, the eNB includes:

a transmitting unit 161 configured to transmit a cell measurement request to UE, such that the UE performs cell measurement according to the cell measurement request and reports a cell measurement result;

a selecting unit 162 configured to select a target eNB for the UE according to the cell measurement result after receiving the cell measurement result reported by the UE; and a controlling unit 163 configured to control the target eNB to detect an uplink signal, so as to obtain time advance information.

In an embodiment, the transmitting unit 161 is further configured to transmit a handover command to the UE, such that the UE performs cell handover and reconfiguration according to the handover command;

wherein, the UE detaches from a serving eNB and reserves an uplink time adjustment parameter $N_{TA}$ of the serving eNB when receiving the handover command.

In an embodiment, the handover command contains a time advance command, the time advance command including uplink time advance information of the target eNB, such that the UE determines uplink transmission time according to the reserved uplink time adjustment parameter and the uplink time advance information of the target eNB.

With the serving eNB of this embodiment, when the UE is still in a state of being connected to the serving eNB, the serving eNB controls the target eNB selected for the UE to detect the uplink signal of the UE to determine uplink time advance between the UE and the target eNB, and the serving eNB of the UE further indicates the UE to replace the source serving eNB with a new target eNB. Therefore, as the UE is made to establish downlink synchronization/uplink synchronization between the UE and the new target eNB, time delay due to uplink/downlink synchronization in the cell reconfiguration/handover process is efficiently reduced, and complexity of the UE is lowered.

An embodiment of the present application further provides a target eNB, as described in Embodiment 14 below. As the principle of the target eNB for solving problems is similar to the method in Embodiment 11, the implementation of the method in Embodiment 11 is referred to for the implementation of the target eNB, and the repeated parts shall not be described any further.

Embodiment 14

Figure 17:
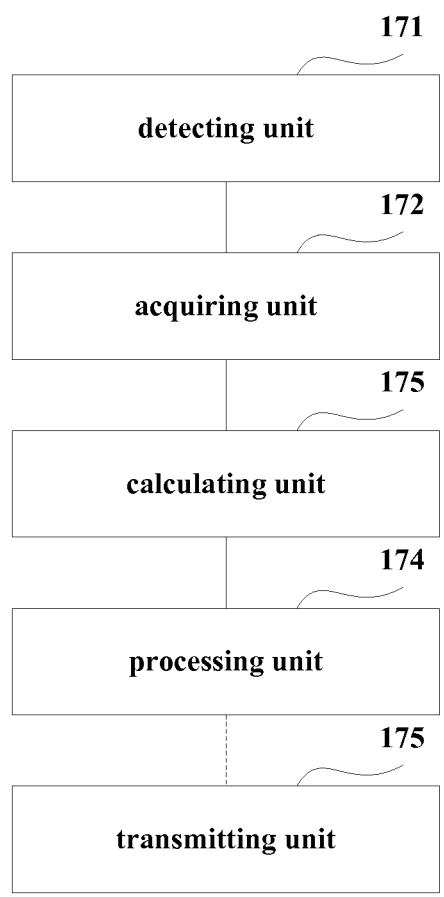
FIG. 17 is a schematic diagram of the structure of the target eNB of Embodiment 14 of the present application.

An embodiment of the present application further provides an eNB. FIG. 17 is a schematic diagram of the structure of the eNB. Referring to FIG. 17, the eNB includes:

a detecting unit 171 configured to detect an uplink signal of UE according to control of a serving eNB of the UE;

an acquiring unit 172 configured to acquire uplink timing information of the UE relative to a home;

a calculating unit 173 configured to calculate uplink time advance of the home according to the uplink timing information; and a processing unit 174 configured to provide the uplink time advance to the serving eNB of the UE.

In an embodiment, the calculating unit 173 may calculate the uplink time advance of the home with reference to a downlink clock of the serving eNB of the UE according to an $N_{TA}$ value of the serving eNB reserved by the UE and the uplink timing information.

In another embodiment, the calculating unit may calculate the uplink time advance of the home with reference to a downlink clock of the home according to the $N_{TA}$ value of the serving eNB reserved by the UE and the uplink timing information. In this embodiment, the calculating unit 173 may acquire the downlink clock of the home from the UE via the acquiring unit 172, and may also determine the downlink clock of the home according to a received signal time delay difference.

In an embodiment, the eNB further includes:

a transmitting unit 175 configured to transmit uplink resource allocation information to the UE, such that the UE feeds back reconfiguration completion information according to the uplink resource allocation information.

In this embodiment, the uplink resource allocation information may contain a time advance command, the time advance command including uplink time advance information of the target eNB, such that the UE determines uplink transmission time according to the reserved uplink time adjustment parameter and the uplink time advance information of the target eNB.

With the target eNB of this embodiment, when the UE is still in a state of being connected to the serving eNB, the target eNB selected by its serving eNB for it begins to detect its uplink signal to determine uplink time advance between the UE and the target eNB, and the UE replaces the source serving eNB with a new target eNB according to the indication of its serving eNB. Therefore, as the UE is made to establish downlink synchronization/uplink synchronization between the UE and the new target eNB, time delay due to uplink/downlink synchronization in the cell reconfiguration/handover process is efficiently reduced, and complexity of the UE is lowered.

An embodiment of the present application further provides a communication system, including the UE as described in Embodiment 5, the macro eNB as described in Embodiment 6, the target eNB as described in Embodiment 7 and the serving eNB as described in Embodiment 8.

An embodiment of the present application further provides a communication system, including the UE as described in Embodiment 12, the serving eNB as described in Embodiment 13 and the target eNB as described in Embodiment 14.

An embodiment of the present application further provides a computer-readable program, wherein when the program is executed in an eNB, the program enables a computer to carry out the method for cell handover and reconfiguration as described in embodiments 2-4 and 10-11 in the eNB.

An embodiment of the present application further provides a storage medium in which a computer-readable program is stored, wherein the computer-readable program enables a computer to carry out the method for cell handover and reconfiguration as described in embodiments 2-4 and 10-11 in an eNB.

An embodiment of the present application further provides a computer-readable program, wherein when the program is executed in terminal equipment, the program enables a computer to carry out the method for cell handover and reconfiguration as described in embodiments 1 and 9 in the terminal equipment.

An embodiment of the present application further provides a storage medium in which a computer-readable program is stored, wherein the computer-readable program enables a computer to carry out the method for cell handover and reconfiguration as described in embodiments 1 and 9 in terminal equipment.

The above apparatuses and methods of the present application may be implemented by hardware, or by hardware in combination with software. The present application relates to such a computer-readable program that when the program is executed by a logic device, the logic device is enabled to carry out the apparatus or components as described above, or to carry out the methods or steps as described above. The present application also relates to a storage medium for storing the above program, such as a hard disk, a floppy disk, a CD, a DVD, and a flash memory, etc.

The present application is described above with reference to particular embodiments. However, it should be understood by those skilled in the art that such a description is illustrative only, and not intended to limit the protection scope of the present application. Various variants and modifications may be made by those skilled in the art according to the principle of the present application, and such variants and modifications fall within the scope of the present application.

What is claimed is:

1. User equipment (UE), comprising:
a measuring unit configured to perform cell measurement according to a cell measurement request and report a cell measurement result;
a processing unit configured to detach, when receiving a handover command transmitted by a macro eNB or a serving eNB of the UE, from the serving eNB and reserve an uplink time adjustment parameter $N_{TA}$ of the serving eNB; and
a configuring unit configured to perform cell handover and reconfiguration according to the handover command,
wherein the UE further comprises:
a determining unit configured to determine uplink transmission time according to the uplink time adjustment parameter and uplink time advance information of the target eNB if receiving the handover command including the uplink time advance information of the target eNB,
wherein the determining unit:
takes a sampling point advanced by $N_{TA\_new}$ as the uplink transmission time with reference to downlink timing information of the target eNB; or
takes the sampling point advanced by $N_{TA\_new}$ as the u link transmission time with reference to downlink timing information of the serving eNB if receiving a first time advance command, and takes the sampling point advanced by $N_{TA\_new}$ as the uplink transmission time with reference to downlink timing information of the target eNB if receiving other time advance commands than the first time advance command; or
takes a sampling point advanced by $N_{TA\_new}+\Delta t$ as the uplink transmission time with reference to downlink timing information of the target eNB according to a downlink timing difference $\Delta t$ obtained through measurement if receiving a first time advance command, and takes the sampling point advanced by $N_{TA\_new}$ as the uplink transmission time if receiving other time advance commands than the first time advance command;
wherein the uplink transmission time $N_{TA\_new}=N_{TA\_old}+TA$; where, $N_{TA\_old}$ is the $N_{TA}$ value of the serving eNB reserved by the UE, and TA is a received TA value of the target eNB.

2. The UE according to claim 1, wherein the UE further comprises:
a reporting unit configured to feed reconfiguration completion information back to the macro eNB or a target eNB according to uplink resource allocation information if receiving the uplink resource allocation information transmitted by the macro eNB or the target eNB.

3. User equipment (UE), comprising:
a measuring unit configured to perform cell measurement according to a cell measurement request of a serving eNB and report a cell measurement result;
a processing unit configured to detach from the serving eNB and reserve an uplink time adjustment parameter $N_{TA}$ of the serving eNB when receiving the UE receives a handover command transmitted by the serving eNB;
a configuring unit configured to perform cell handover and reconfiguration according to the handover command, and
a determining unit configured to determine uplink transmission time according to the uplink time adjustment parameter and uplink time advance information of the target eNB if receiving the handover command containing the uplink time advance information of the target eNB
wherein the UE further comprises:
a reporting unit configured to feed reconfiguration completion information back to the target eNB after completing reconfiguration at the determined uplink transmission time according to uplink resource allocation information if receiving the uplink resource allocation information transmitted by the target eNB; and wherein the time advance command is transmitted by the serving eNB via the handover command, or is transmitted by the target eNB via the uplink resource allocation information, wherein the determining unit takes a sampling point advanced by $N_{TA\_new}$ as the uplink transmission time with reference to downlink timing information of the target eNB; or the determining unit takes the sampling point advanced by $N_{TA\_new}$ as the uplink transmission time with reference to downlink timing information of the serving eNB if receiving a first time advance command, and takes the sampling point advanced by $N_{TA\_new}$ as the uplink transmission time with reference to downlink timing information of the target eNB if receiving other time advance commands than the first time advance command; or the determining unit takes a sampling point advanced by $N_{TA\_new}+\Delta t$ as the uplink transmission time with reference to downlink timing information of the target eNB according to a downlink timing difference $\Delta t$ obtained through measurement if receiving a first time advance command, and takes the sampling point advanced by $N_{TA\_new}$ as the uplink transmission time if receiving other time advance commands than the first time advance command;

wherein the uplink transmission time $N_{TA\_new}=N_{TA\_old}+TA$; where, $N_{TA\_old}$ is the $N_{TA}$ value of the serving eNB reserved by the UE, and TA is a received TA value of the target eNB.

* * * * *